United States Patent
Sato et al.

(10) Patent No.: US 11,603,928 B2
(45) Date of Patent: Mar. 14, 2023

(54) VEHICLE DRIVE DEVICE AND CONTROL DEVICE

(71) Applicant: AISIN CORPORATION, Aichi (JP)

(72) Inventors: Yasuyuki Sato, Kariya (JP); Subrata Saha, Kariya (JP); Hideki Kakisako, Kariya (JP); Shotaro Kondo, Kariya (JP); Junichiro Ohtsubo, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/424,938

(22) PCT Filed: Mar. 19, 2020

(86) PCT No.: PCT/JP2020/012454
§ 371 (c)(1),
(2) Date: Jul. 22, 2021

(87) PCT Pub. No.: WO2020/196319
PCT Pub. Date: Oct. 1, 2020

(65) Prior Publication Data
US 2022/0107021 A1    Apr. 7, 2022

(30) Foreign Application Priority Data

Mar. 22, 2019 (JP) .............................. JP2019-054444

(51) Int. Cl.
*F16H 63/38*       (2006.01)
*F16D 48/06*       (2006.01)
(Continued)

(52) U.S. Cl.
CPC ........... *F16H 63/38* (2013.01); *F16D 48/068* (2013.01); *F16D 2500/3026* (2013.01);
(Continued)

(58) Field of Classification Search
CPC ............. F16H 63/38; F16H 2061/2823; F16H 2061/283; F16H 2061/2884; F16H 2061/326
See application file for complete search history.

(56) References Cited

U.S. PATENT DOCUMENTS 8,914,209 B2    12/2014   Mori et al.
11,247,645 B2    2/2022   Kamio
(Continued)

FOREIGN PATENT DOCUMENTS

CN    103968065 A    8/2014
CN    105626847 A    6/2016
(Continued)

OTHER PUBLICATIONS

International Search Report of PCT/JP2020/012454 dated Jun. 16, 2020 [PCT/ISA/210].

(Continued)

*Primary Examiner* — Timothy Hannon
(74) *Attorney, Agent, or Firm* — Sughrue Mion, PLLC

(57) ABSTRACT

A vehicle drive device (1) is disclosed that includes a shift detent mechanism (90); an actuator (74) that generates drive power for allowing the shift detent mechanism to operate; a sensor (135) that generates sensor information indicating an amount of operation of the shift detent mechanism; a control part (153) that controls the actuator; and a clutch (30) that is synchronized with operation of the shift detent mechanism, and when the control part changes a state of the clutch, the control part performs feedback control of the actuator based on a relationship between a target value for an amount of operation of the shift detent mechanism and the sensor information, and before completing the change in the state of the clutch, the feedback control ends and operation of the actuator stops.

14 Claims, 20 Drawing Sheets

(51) Int. Cl.
    *F16H 61/28* (2006.01)
    *F16H 61/32* (2006.01)
(52) U.S. Cl.
    CPC .............. *F16H 2061/283* (2013.01); *F16H 2061/2823* (2013.01); *F16H 2061/2884* (2013.01); *F16H 2061/326* (2013.01)

(56) References Cited

U.S. PATENT DOCUMENTS

| | | | |
|---|---|---|---|
| 2009/0265066 | A1 | 10/2009 | Ogawa et al. |
| 2014/0214294 | A1* | 7/2014 | Mori ...................... F16D 11/10 701/60 |
| 2019/0202417 | A1 | 7/2019 | Kamio |
| 2020/0011414 | A1 | 1/2020 | Sakaguchi |

FOREIGN PATENT DOCUMENTS

| | | | |
|---|---|---|---|
| CN | 109312851 | A | 2/2019 |
| EP | 2762756 | A2 | 8/2014 |
| EP | 3006781 | A1 | 4/2016 |
| JP | 2009-257490 | A | 11/2009 |
| JP | 2013-064469 | A | 4/2013 |
| JP | 2014-047817 | A | 3/2014 |
| JP | 2018-179142 | A | 11/2018 |

OTHER PUBLICATIONS

Extended European Search Report dated Apr. 20, 2022 in European Application No. 20779297.9.

\* cited by examiner

VEHICLE DRIVE DEVICE AND CONTROL DEVICE

CROSS REFERENCE TO RELATED APPLICATIONS

This application is a National Stage of International Application No. PCT/JP2020/012454 filed on Mar. 19, 2020, claiming priority based on Japanese Patent Application No. JP2019-054444 filed on Mar. 22, 2019, the contents of which are incorporated in their entirety.

TECHNICAL FIELD

The present disclosure relates to a vehicle drive device and a control device.

BACKGROUND ART

There is known a vehicle drive device that changes the state of a synchromesh mechanism (clutch) by driving a shift detent mechanism by feedback control of an actuator based on sensor information from a stroke sensor.

CITATIONS LIST

Patent Literature

Patent Literature 1: JP 2013-64469 A

SUMMARY OF THE DISCLOSURE

Technical Problems

However, conventional art such as that described above has difficulty in increasing the convergence stability of the shift detent mechanism (stability upon converging the position of a ball plunger to a final target position within a recessed part of the shift detent mechanism) when sensor information from the stroke sensor includes a significant error.

Hence, the present disclosure increases the convergence stability of the shift detent mechanism.

Solutions to Problems

According to one aspect of the present disclosure, there is provided a vehicle drive device including:

a shift detent mechanism;

an actuator that generates drive power for allowing the shift detent mechanism to operate;

a sensor that generates sensor information indicating an amount of operation of the shift detent mechanism;

a control part that controls the actuator; and a clutch that is synchronized with operation of the shift detent mechanism, in which when the control part changes a state of the clutch, the control part performs feedback control of the actuator based on a relationship between a target value for an amount of operation of the shift detent mechanism and the sensor information, and before completing the change in the state of the clutch, the feedback control ends and operation of the actuator stops.

Advantageous Effects of Various Aspects of the Disclosure

According to the present disclosure, the convergence stability of the shift detent mechanism can be increased.

DESCRIPTION OF EMBODIMENTS

Each embodiment will be described in detail below with reference to the accompanying drawings. Note that in this specification, the term "predetermined" is used to refer to "determined in advance".

Figure 1:
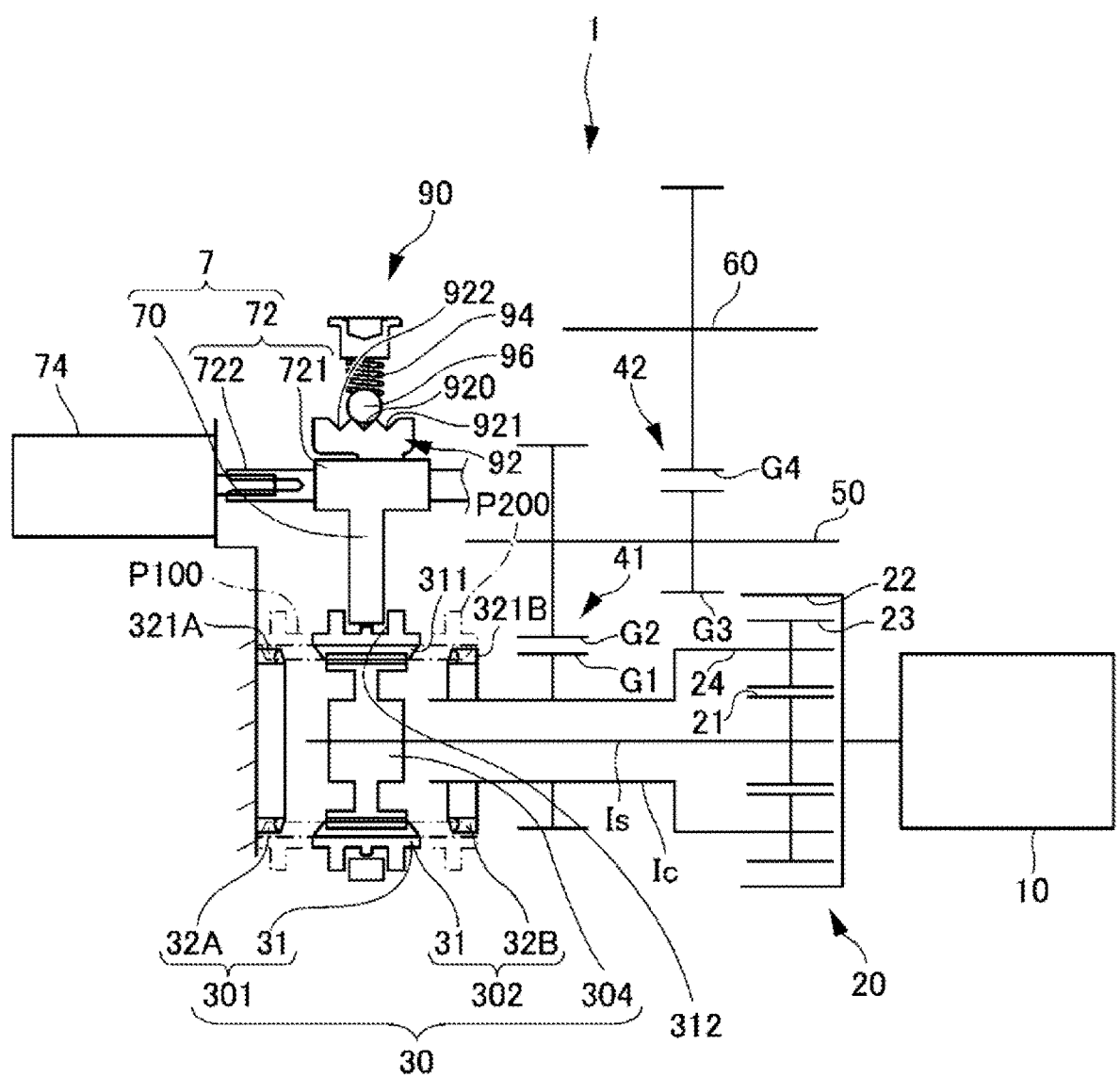
FIG. 1 is a schematic diagram showing a configuration of a vehicle drive device of one embodiment.

FIG. 1 is a schematic diagram showing a configuration of a vehicle drive device 1 of one embodiment. In FIG. 1, a configuration of a part of the vehicle drive device is shown using a skeleton diagram.

The vehicle drive device 1 is a drive device for an electric vehicle, and includes a motor 10 (an example of a rotating electrical machine), a planetary gear mechanism 20, an engagement device 30 (an example of a clutch), a first gear train 41, and a second gear train 42.

The motor 10 generates rotational torque for vehicle drive. Note that the motor 10 may be of any type, any structure, etc. The motor 10 may be a motor/generator that can also function as a generator.

The planetary gear mechanism 20 is provided between the motor 10 and an output shaft 60. In the present embodiment, as an example, the planetary gear mechanism 20 is of a single pinion type. The planetary gear mechanism 20 includes a sun gear 21, a ring gear 22, a pinion 23, and a carrier 24.

The engagement device 30 is a clutch that can selectively form a mechanically meshed state and a mechanically non-meshed state. The engagement device 30 includes dog clutches 301 and 302. The dog clutches 301 and 302 each include two elements that go into a meshed state when axially coming close to each other and go into a non-meshed state when axially separated from each other. Note that the expression "come close to each other" is a concept including a state in which parts of the respective elements axially overlap each other.

In the present embodiment, as shown in FIG. 1, the engagement device 30 includes a first element 31 in a sleeve form, second elements 32A and 32B in a clutch ring form, and a clutch hub 304. In this case, in the engagement device 30, the first element 31 and the second element 32A form one dog clutch 301, and the first element 31 and the second element 32B form another dog clutch 302. Note that in this case the first element 31 is a common element that forms the two dog clutches 301 and 302.

The first element 31 has a substantially rotationally symmetrical form with respect to a shaft Is. The first element 31 has tooth-like parts 311 for meshing, on an inner circumferential side thereof in a circumferential direction and at every predetermined angle. For example, an axial end part (tooth end) of each tooth-like part 311 may have a chamfered form. Each tooth-like part 311 extends in a radial direction with respect to the shaft Is in a mode in which the tooth-like part 311 protrudes toward a radial inner side, and the plurality of tooth-like parts 311 extend radially as viewed in a direction along the shaft Is.

The first element 31 has, on an outer circumferential surface thereof, a recessed groove 312 that is recessed toward a radial inner side. The recessed groove 312 extends all around the outer circumferential surface in a circumferential direction. As will be described later, the recessed groove 312 moves in cooperation with a shift fork 70.

The first element 31 is provided in a mode in which the first element 31 can translate with the clutch hub 304 along the shaft Is and cannot rotate about the shaft Is. For example, the first element 31 may be spline-coupled to the clutch hub 304. The clutch hub 304 rotates together with the shaft Is of the sun gear 21. Thus, the first element 31 together with the clutch hub 304 rotates together with the shaft Is of the sun gear 21, but can translate along the shaft Is of the sun gear 21.

In this manner, in a rotating state or a non-rotating state, the first element 31 can translate along the shaft Is between a neutral position shown in FIG. 1, a position in which the first element 31 meshes with the second element 32A (see a position P100 of FIG. 1), and a position in which the first element 31 meshes with the second element 32B (see a position P200 of FIG. 1).

The second element 32A has a substantially rotationally symmetrical form with respect to the shaft Is. An outer circumferential surface of the second element 32A has a smaller diameter than an inner circumferential surface of the first element 31, and by a radial length according to a radial difference between the surfaces, the tooth-like parts 311 of the first element 31 and tooth-like parts 321A (described later) of the second element 32A are formed. As with the tooth-like parts 311 of the first element 31, the second element 32A has tooth-like parts 321A for meshing, in a circumferential direction and at every predetermined angle. The tooth-like parts 321A are formed on the outer circumferential surface of the second element 32A in a circumferential direction. Each tooth-like part 321A extends in a radial direction with respect to the shaft Is in a mode in which the tooth-like part 321A protrudes toward a radial outer side, and the plurality of tooth-like parts 321A extend radially as viewed in the direction along the shaft Is. Note that the plurality of tooth-like parts 321A may be formed in a mode in which some of the tooth-like parts 321A are longer than the other tooth-like parts 321A toward a first element 31 side in the direction along the shaft Is.

The tooth-like parts 321A of the second element 32A and the tooth-like parts 311 of the first element 31 form a meshed state when the second element 32A and the first element 31 axially come close to each other. When the meshed state is formed, it becomes possible to transfer rotational torque about the shaft Is between the first element 31 and the second element 32A.

Unlike the second element 32B, the second element 32A is a fixed element and is fixed to, for example, a motor housing (not shown).

As with the second element 32A, the second element 32B has a substantially rotationally symmetrical form with respect to the shaft Is and has tooth-like parts 321B for meshing, in a circumferential direction and at every predetermined angle.

The tooth-like parts 321B of the second element 32B and the tooth-like parts 311 of the first element 31 form a meshed state when the second element 32B and the first element 31 axially come close to each other. When the meshed state is formed, it becomes possible to transfer rotational torque about the shaft Is between the first element 31 and the second element 32B.

The second element 32B is a rotating element and rotates together with a rotating shaft Ic of the carrier 24 as will be described later.

The first gear train 41 includes a gear G1 and a gear G2 that mesh together radially. The gear G1 is provided on the rotating shaft Ic and rotates together with the rotating shaft Ic, and the gear G2 is provided on a countershaft 50 and rotates together with the countershaft 50.

The second gear train 42 includes a gear G3 and a gear G4 that mesh together radially. The gear G3 is provided on the countershaft 50 and rotates together with the countershaft 50. The gear G4 is provided on the output shaft 60 and rotates together with the output shaft 60.

The vehicle drive device 1 further includes the shift fork 70, a ball screw mechanism 72, and an actuator 74.

The shift fork 70 slidably fits into the recessed groove 312 of the first element 31. Namely, the shift fork 70 enables rotation of the first element 31 about the shaft Is, whereas the shift fork 70 restrains relative movement of the first element 31 in the direction along the shaft Is.

The shift fork 70 is coupled to a nut 721 of the ball screw mechanism 72. Note that the nut 721 may be integrally formed with the shift fork 70.

The ball screw mechanism 72 includes the nut 721, a screw shaft 722, balls (not shown), etc.

The actuator 74 is, for example, an electric motor that can rotate in forward and reverse directions, and is coupled to the screw shaft 722. For example, the actuator 74 is three-phase electric motor and includes a rotor 741 and a stator 742 (see FIG. 13A). Note that in FIG. 13A, as an example, the rotor 741 has four poles ("S" and "N" shown in FIG. 13A indicate the magnetic poles of permanent magnets) and the stator 742 has three slots, by which a four-pole three-slot electric motor is formed. Note that the number of poles, the number of slots, and the number of phases are any, and other numerical values may be used.

When the actuator 74 allows the screw shaft 722 to rotate in the forward direction, the nut 721 and accordingly the shift fork 70 move toward one side along the screw shaft 722, and when the actuator 74 allows the screw shaft 722 to rotate in the reverse direction, the nut 721 and accordingly the shift fork 70 move toward the other side along the screw shaft 722.

When the actuator 74 is thus driven, the shift fork 70 and accordingly the first element 31 are translationally driven along the shaft Is through the ball screw mechanism 72. Note that the shift fork 70 and the ball screw mechanism 72 form, as described above, a power transferring part that transfers drive power of the actuator 74 to the engagement device 30 (the first element 31). Hereinafter, the shift fork 70 and the ball screw mechanism 72 are also collectively referred to as "power transferring part 7".

In addition, the vehicle drive device 1 further includes a shift detent mechanism 90.

The shift detent mechanism 90 has a function of defining (stabilizing) the position in the direction along the shaft Is of the first element 31 at a plurality of stabilized positions by defining the position of the shift fork 70. In the present embodiment, the plurality of stabilized positions correspond to a position in which the first element 31 and the second element 32A mesh together, a position in which the first element 31 and the second element 32B mesh together, and a neutral position in which the first element 31 does not mesh with either of the second elements 32A and 32B.

The shift detent mechanism 90 includes a fork shaft 92 (an example of a recessed-part forming member), a coil spring 94 (an example of an elastic member), and a lock ball 96 (an example of an engagement element).

The fork shaft 92 is a member integrally formed with the shift fork 70 and is, for example, as schematically shown in FIG. 1, coupled to the nut 721. The fork shaft 92 has three recessed parts (detents) 920, 921, and 922 corresponding to the above-described three stabilized positions. The recessed parts 920, 921, and 922 are provided in a mode in which they are arranged in a moving direction of the fork shaft 92.

The coil spring 94 biases the lock ball 96 toward the fork shaft 92. The coil spring 94 has one end supported by, for example, the motor housing (not shown) and the other end at which the lock ball 96 is provided.

The lock ball 96 can fit in any one of the recessed parts 920, 921, and 922 provided in the fork shaft 92, by being biased toward the fork shaft 92 by the coil spring 94. When the lock ball 96 fits in any one of the recessed parts 920, 921, and 922, it becomes difficult for the fork shaft 92 to easily move from that position, and the lock ball 96 has a function of stabilizing the fork shaft 92 at that position. Note that the positions of the fork shaft 92 for when the lock ball 96 fits in any one of the recessed parts 920, 921, and 922 correspond to the above-described three stabilized positions. Specifically, a state in which the lock ball 96 fits in the recessed part 922 corresponds to a state in which the first element 31 and the second element 32B mesh together (a second meshed state which will be described later), a state in which the lock ball 96 fits in the recessed part 920 corresponds to a state in which the first element 31 does not mesh with either of the second elements 32A and 32B (a non-meshed state which will be described later), and a state in which the lock ball 96 fits in the recessed part 921 corresponds to a state in which the first element 31 and the second element 32A mesh together (a first meshed state which will be described later).

Next, with still reference to FIG. 1, a connection relationship between the motor 10, the planetary gear mechanism 20, the engagement device 30, etc., (a connection relationship related to vehicle drive) will be described.

The output shaft (differential shaft) 60 is connected to the motor 10 through the planetary gear mechanism 20. Specifically, an output shaft of the motor 10 is coupled to the ring gear 22 of the planetary gear mechanism 20 and rotates together with the ring gear 22. In the planetary gear mechanism 20, the carrier 24 is connected to the output shaft 60. Namely, the rotating shaft Ic of the carrier 24 is connected to the countershaft 50 through the first gear train 41, and the countershaft 50 is connected to the output shaft 60 through the second gear train 42. In this manner, the motor 10 is connected to the output shaft 60 through the ring gear 22 and the carrier 24 of the planetary gear mechanism 20, the first gear train 41, and the second gear train 42.

In addition, the engagement device 30 is connected to the motor 10 through the planetary gear mechanism 20. Specifically, the second element 32B of the dog clutch 302 is coupled to the rotating shaft Ic of the carrier 24 of the planetary gear mechanism 20. The second element 32B rotates together with the rotating shaft Ic about the rotating shaft Ic. In addition, the first element 31 that forms the dog clutches 301 and 302 is coupled to the shaft Is which is the rotating shaft of the sun gear 21 of the planetary gear mechanism 20. The first element 31 rotates together with the shaft Is. Note that as described above, the first element 31 is provided on the shaft Is so that the first element 31 can axially translate and cannot rotate about the shaft. Namely, the first element 31 rotates together with the sun gear 21, but can move axially.

Figure 2:
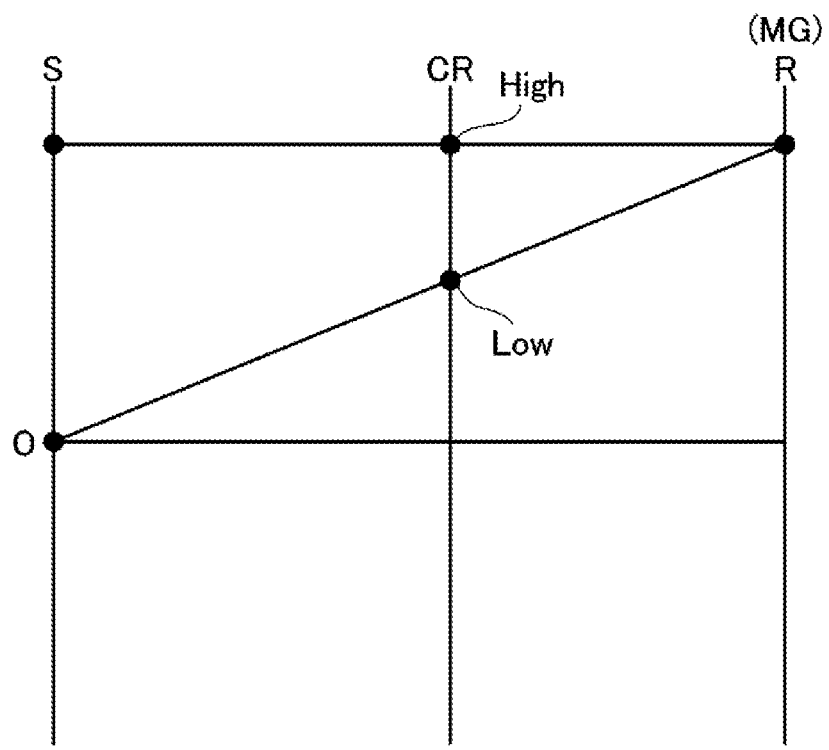
FIG. 2 is a speed diagram of a planetary gear mechanism in the vehicle drive device.

Next, with reference to FIG. 2, gear changes of the vehicle drive device 1 will be schematically described. FIG. 2 is a speed diagram of the planetary gear mechanism 20 in the vehicle drive device 1.

In the present embodiment, the engagement device 30 can transition between a state in which the first element 31 and the second element 32A mesh together (hereinafter, referred to as "first meshed state"), a state in which the first element 31 and the second element 32B mesh together (hereinafter, referred to as "second meshed state"), and a state in which the first element 31 does not mesh with either of the second elements 32A and 32B (hereinafter, referred to as "non-meshed state"). Note that the first meshed state corresponds to an engaged state of the dog clutch 301, the second meshed state corresponds to an engaged state of the dog clutch 302, and the non-meshed state corresponds to non-engaged states of the dog clutches 301 and 302.

When the first meshed state of the engagement device 30 is implemented, a low gear is achieved. Specifically, in the first meshed state, the sun gear 21 is fixed by the second element 32A. Thus, the rotational speed of the motor 10 is reduced by the planetary gear mechanism 20 and is outputted to the rotating shaft Ic (see the "Low" line of FIG. 2), and the rotational speed of the rotating shaft Ic is further reduced by the first gear train 41 (the gear G1 and the gear G2) and the second gear train 42 (the gear G3 and the gear G4) and is outputted to the output shaft 60.

When the second meshed state of the engagement device 30 is implemented, a high gear is achieved. Specifically, in the second meshed state, the sun gear 21 and the rotating shaft Ic of the carrier 24 are integrated by the second element 32B. Thus, the rotational speed of the motor 10 is outputted as it is to the rotating shaft Ic without being reduced by the planetary gear mechanism 20 (see the "High" line of FIG. 2), and the rotational speed of the rotating shaft Ic is reduced by the first gear train 41 (the gear G1 and the gear G2) and the second gear train 42 (the gear G3 and the gear G4) and is outputted to the output shaft 60.

When the non-meshed state of the engagement device 30 is implemented, neutral is achieved. Specifically, the sun gear 21 is free, with the rotating shaft Ic receiving reaction force from the output shaft 60.

Next, with reference to FIG. 3, a detail of the shift detent mechanism 90 will be described.

Figure 3:
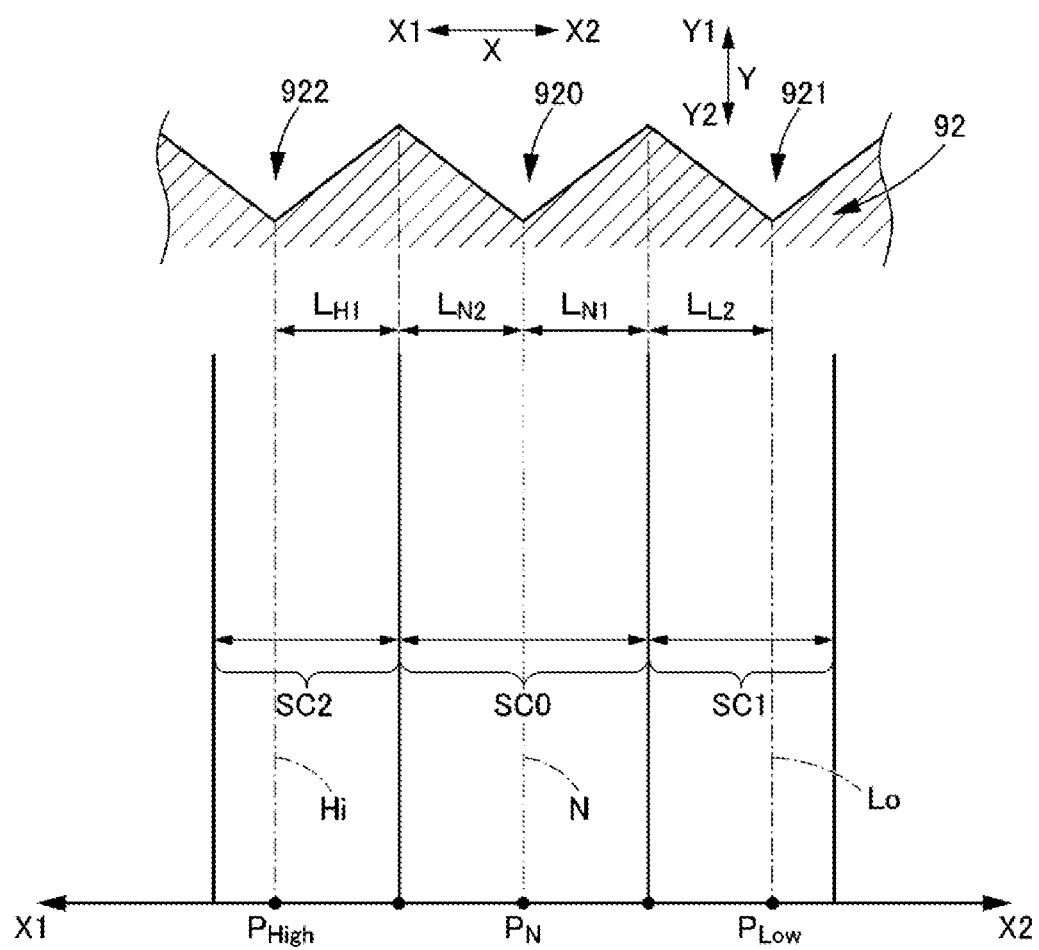
FIG. 3 is an illustrative diagram of a shift detent mechanism.

FIG. 3 is an illustrative diagram of the shift detent mechanism 90. At the top of FIG. 3 there is shown a schematic cross-sectional view of the fork shaft 92. At the bottom of FIG. 3 there is shown an illustrative diagram of a relationship between the movement distance of the fork shaft 92 with respect to the lock ball 96 and each state of the shift detent mechanism 90, in association with the cross-sectional view of the fork shaft 92. FIG. 3 shows an X-direction (an example of a second direction) as a direction parallel to the shaft Is, and a Y-direction (an example of a first direction) perpendicular to the X-direction, and shows, for each direction, an X1-side (an example of a first side) and an X2-side (an example of a second side) and a Y1-side and a Y2-side. In addition, in FIG. 3, for the sake of description, the positions of the shift fork 70 and the first element 31 are associated with dotted lines Lo, Hi, and N representing corresponding shift speeds "High", "Low", and "neutral (N)".

In addition, on an axis at the bottom of FIG. 3, a position $P_N$ corresponds to a non-meshed state, a position $P_{Low}$ corresponds to a first meshed state, and a position $P_{High}$ corresponds to a second meshed state, and all positions represent positions on the fork shaft 92. Note that in the following the movement distance of the fork shaft 92 with respect to the lock ball 96 (movement distance in the X-direction) is also simply referred to as "movement distance of the fork shaft 92" or "stroke length of the fork shaft 92".

Here, as shown in FIG. 3, etc., each of the recessed parts 920, 921, and 922 of the fork shaft 92 has a form in which in order to increase a positional stability function, a "projection" (a protrusion in the Y-direction toward the Y1-side) and a "depression" (a protrusion in the Y-direction toward the Y2-side) are formed by inclined planes. Note that although the top of the "projection" and the bottom of the "depression" are shown to have acute angles, a corner portion of each of the recessed parts 920, 921, and 922 of the fork shaft 92 may have a rounded corner R.

Unless the lock ball 96 goes over a "projection" in the X-direction of the fork shaft 92, the lock ball 96 cannot move to a "depression" present ahead of the "projection". In other words, when the lock ball 96 is located on an inclined surface of a "projection", a force that moves the fork shaft 92 in a direction in which the lock ball 96 goes down the inclined surface and moves toward a "depression" is generated on the fork shaft 92 from the coil spring 94 through the lock ball 96. At this time, when the drive power (drive current) of the actuator 74 reaches "0", the lock ball 96 moves to the "depression".

The position $P_{High}$ corresponds to the position of a "depression" at the recessed part 922, and a section SC2 corresponds to a section between "inclined surfaces" on both sides of the "depression" at the recessed part 922 (inclined surfaces leading to adjacent "projections"), with the "depression" being at the center. Likewise, the position $P_{Low}$ corresponds to the position of a "depression" at the recessed part 921, and a section SC1 corresponds to a section between "inclined surfaces" on both sides of the "depression" at the recessed part 921, with the "depression" being at the center. Likewise, the position $P_N$ corresponds to the position of a "depression" at the recessed part 920, and a section SC0 corresponds to a section between "inclined surfaces" on both sides of the "depression" at the recessed part 920, with the "depression" being at the center.

In this case, when the drive power of the actuator 74 reaches "0" with the lock ball 96 located within the section SC0, the lock ball 96 is drawn into the "depression" at the recessed part 920 (position $P_N$) so that the fork shaft 92 reaches the N position, and fits in the recessed part 920. Likewise, when the drive power of the actuator 74 reaches "0" with the lock ball 96 located within the section SC1, the lock ball 96 is drawn into the "depression" at the recessed part 921 (position $P_{Low}$) so that the fork shaft 92 reaches a position for the first meshed state, and fits in the recessed part 921. Likewise, when the drive power of the actuator 74 reaches "0" with the lock ball 96 located within the section SC2, the lock ball 96 is drawn into the "depression" at the recessed part 922 (position $P_{High}$) so that the fork shaft 92 reaches a position for the second meshed state, and fits in the recessed part 922.

In the present embodiment, a transition from a state in which the lock ball 96 fits in the recessed part 920 to a state in which the lock ball 96 fits in the recessed part 921 becomes possible when the movement distance of the fork shaft 92 exceeds a distance $\Delta L_{N1}$ on the X1-side. In addition, a transition from a state in which the lock ball 96 fits in the recessed part 922 to a state in which the lock ball 96 fits in the recessed part 920 becomes possible when the movement distance of the fork shaft 92 exceeds a distance $\Delta L_{H1}$ on the X1-side.

In addition, a transition from a state in which the lock ball 96 fits in the recessed part 920 to a state in which the lock ball 96 fits in the recessed part 922 becomes possible when the movement distance of the fork shaft 92 exceeds a distance $\Delta L_{N2}$ on the X2-side. Likewise, a transition from a state in which the lock ball 96 fits in the recessed part 921 to a state in which the lock ball 96 fits in the recessed part 920 becomes possible when the movement distance of the fork shaft 92 exceeds a distance $\Delta L_{L2}$ on the X2-side.

Note that in the present embodiment, as an example, it is assumed that the profiles of the recessed parts 920, 921, and 922 are such that the X1-side and the X2-side are symmetrical with respect to the position $P_N$, and the distance $\Delta L_{N2}$=the distance $\Delta L_{H1}$. Namely, in the present embodiment, as an example, it is assumed that the distance $\Delta L_{N2}$=the distance $\Delta L_{H1}$=the distance $\Delta L_{L2}$=the distance $\Delta L_{N1}$.

Next, with reference to FIGS. 4 and 5, a control system of the vehicle drive device 1 will be described. The control system of the vehicle drive device 1 includes a control device 100 for controlling the vehicle drive device 1.

Figure 4:
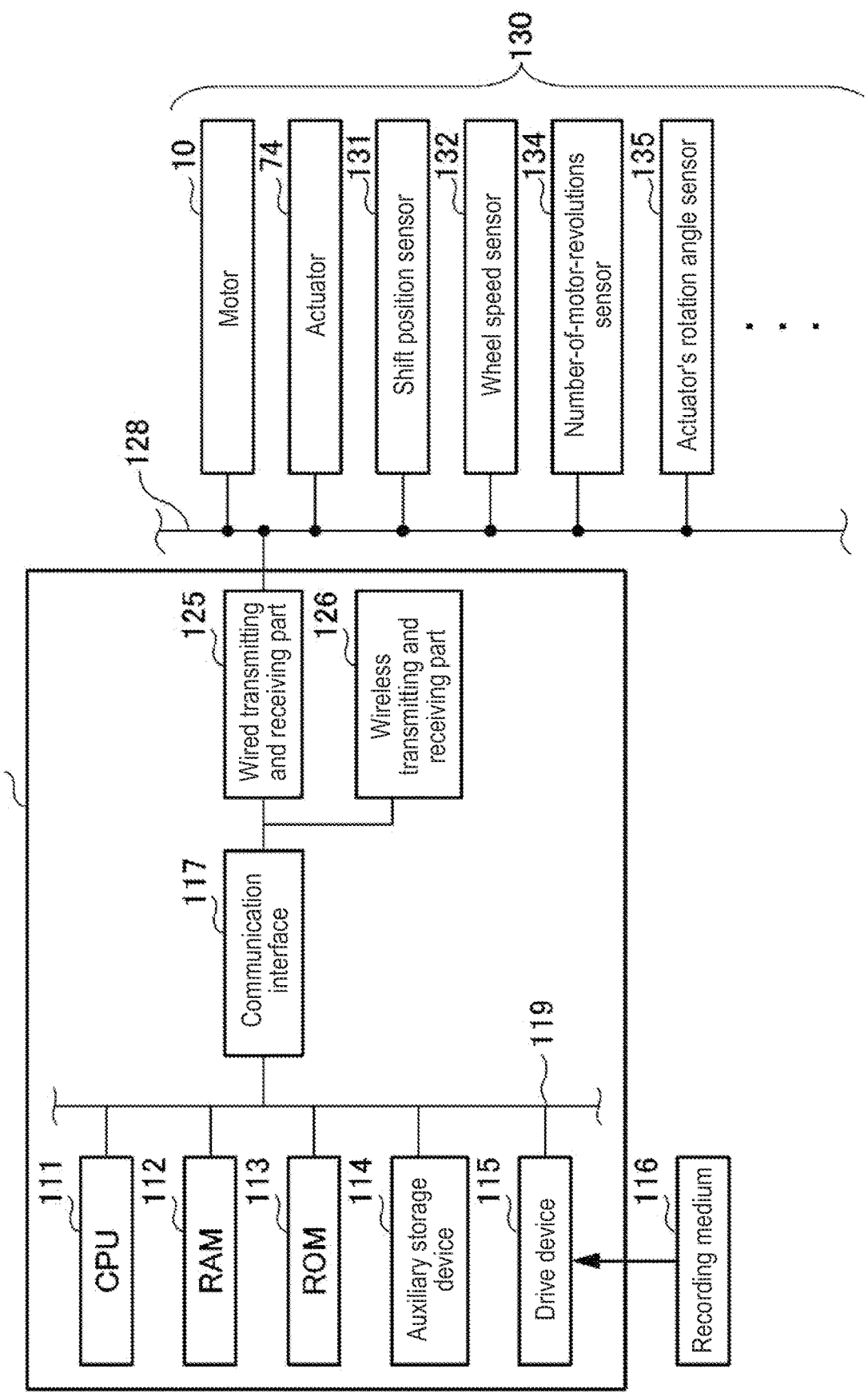
FIG. 4 is a schematic diagram showing an example of a hardware configuration of a control device.

FIG. 4 is a schematic diagram showing an example of a hardware configuration of the control device 100. FIG. 4 schematically shows other in-vehicle electronic devices 130 in association with the hardware configuration of the control device 100.

The other in-vehicle electronic devices 130 include a shift position sensor 131, a wheel speed sensor 132, a number-of-motor-revolutions sensor 134, an actuator's rotation angle sensor 135, etc., in addition to the motor 10 and the actuator 74.

The shift position sensor 131 detects a position of a shift lever operated by a user (driver), and generates a signal based on the position of the shift lever. The wheel speed sensor 132 generates a signal based on vehicle speed. The number-of-motor-revolutions sensor 134 generates a signal based on the number of revolutions of the motor 10. Note that the number-of-motor-revolutions sensor 134 may be a resolver. The actuator's rotation angle sensor 135 generates a signal based on the rotation angle of the actuator 74. The actuator's rotation angle sensor 135 may be, for example, a Hall integrated circuit (IC) or a resolver.

The control device 100 includes a central processing unit (CPU) 111, a random access memory (RAM) 112, a read only memory (ROM) 113, an auxiliary storage device 114, a drive device 115, and a communication interface 117 which are connected to each other by a bus 119, and a wired transmitting and receiving part 125 and a wireless transmitting and receiving part 126 which are connected to the communication interface 117.

The auxiliary storage device 114 is, for example, a hard disk drive (HDD) or a solid state drive (SSD), and is a storage device that stores data related to application software, etc.

The wired transmitting and receiving part 125 includes a transmitting and receiving part that can perform communication using a wired network 128 based on a protocol such as controller area network (CAN) or local interconnect network (LIN). The other in-vehicle electronic devices 130 are connected to the wired transmitting and receiving part 125. Note, however, that some or all of the other in-vehicle electronic devices 130 may be connected to the bus 119 or may be connected to the wireless transmitting and receiving part 126.

The wireless transmitting and receiving part 126 is a transmitting and receiving part that can perform communication using a wireless network. The wireless network may include a wireless communication network for mobile phones, the Internet, a virtual private network (VPN), a wide area network (WAN), etc. In addition, the wireless transmitting and receiving part 126 may include a near field communication (NFC) part, a Bluetooth (registered trademark) communication part, a wireless-fidelity (Wi-Fi) transmitting and receiving part, an infrared transmitting and receiving part, etc.

Note that the control device 100 may be connectable to a recording medium 116. The recording medium 116 stores a predetermined program. The program stored in the recording medium 116 is installed on the auxiliary storage device 114 of the control device 100, etc., through the drive device 115. The installed predetermined program is executable by the CPU 111 of the control device 100. For example, the recording medium 116 may be a recording medium that records information optically, electrically, or magnetically like a compact disc (CD)-ROM, a flexible disk, a magneto-optical disk, etc., or a semiconductor memory that records information electrically like a ROM, a flash memory, etc.

Figure 5:
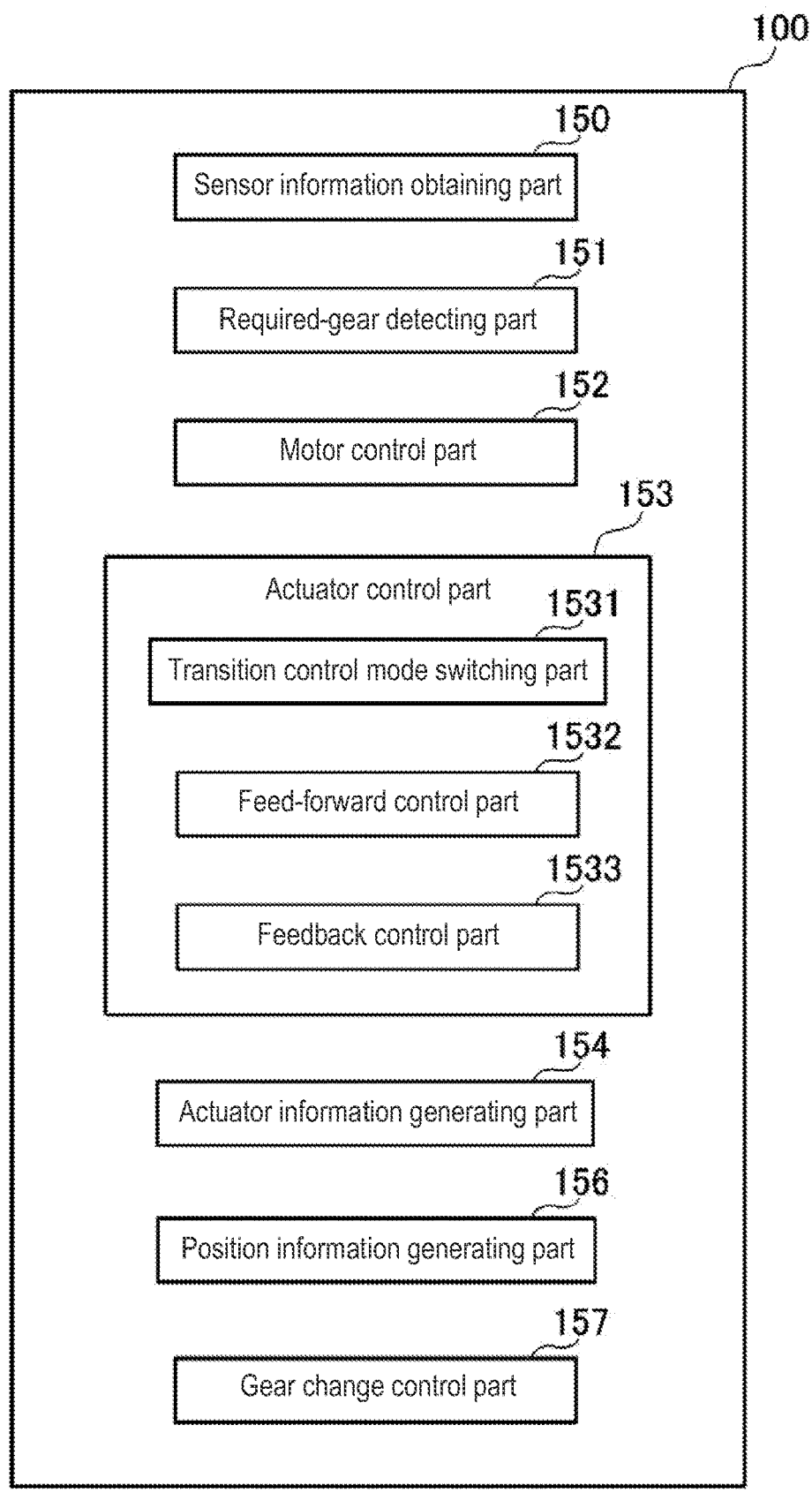
FIG. 5 is a schematic diagram showing an example of functional configurations of the control device of a first embodiment.

FIG. 5 is a schematic diagram showing an example of functional configurations of the control device 100. Note that the functional configurations shown in FIG. 5 do not necessarily represent all functional configurations for implementing all functions of the vehicle drive device 1, and represent configurations related only to specific functions.

As shown in FIG. 5, the control device 100 includes a sensor information obtaining part 150, a required-gear detecting part 151, a motor control part 152, an actuator control part 153, an actuator information generating part 154, a position information generating part 156, and a gear change control part 157. The sensor information obtaining part 150, the required-gear detecting part 151, the motor control part 152, the actuator control part 153, the actuator information generating part 154, the position information generating part 156, and the gear change control part 157 can be implemented by the CPU 111 executing one or more programs in a storage device (e.g., the ROM 113).

The sensor information obtaining part 150 obtains various types of sensor information from the shift position sensor 131, the wheel speed sensor 132, the actuator's rotation angle sensor 135, etc.

The required-gear detecting part 151 determines whether there is a request to change shift speed (hereinafter, also referred to as "gear change request"), based on sensor information from the shift position sensor 131. When there is a gear change request, the required-gear detecting part 151 determines (detects) a shift speed to be achieved (hereinafter, "required gear"). In the present embodiment, as an example, the shift speed includes two gears "High" and "Low" and "neutral". In a case of manual mode, the required-gear detecting part 151 can detect a gear change request and a required gear, based on sensor information from the shift position sensor 131.

In addition, for example, when the shift position sensor 131 is in "D" range, the required-gear detecting part 151 detects a required gear based on, for example, a relationship between vehicle speed and accelerator pedal position. Note that a gear change request and a required gear may be obtained from an external (host) electronic control unit (ECU).

The motor control part 152 controls the motor 10. The motor control part 152 determines target torque which is a control target value of output torque from the motor 10, based on required torque from the driver (which is derived from, for example, accelerator pedal position), and controls the motor 10 so as to achieve the target torque. In addition, in a vehicle having so-called self-driving mode, target torque may be determined based on peripheral information, infrastructure information, etc., from peripheral monitoring sensors (a millimeter-wave radar, light detection and ranging (LiDAR), an image sensor, etc.). In the following, target torque that is determined from required torque from the driver, a surrounding environment, etc., may be referred to as "driver's required torque" in order to distinguish the target torque from target torque that is determined from other factors during gear change control which will be described later.

When the motor control part 152 performs gear change control in cooperation with the gear change control part 157, the motor control part 152 selectively forms a normal torque control state and a number-of-revolutions control state in which the motor 10 is controlled so that the number of motor revolutions reaches a target number of revolutions. Note that in a torque control state during gear change control, target torque is determined in a different mode than the above-described mode (described later with reference to FIG. 6).

The actuator control part 153 controls the actuator 74. Namely, the actuator control part 153 performs, in cooperation with the gear change control part 157, a transition process in which the state of the engagement device 30 transitions between a non-meshed state, a first meshed state, and a second meshed state. A detail of the transition process will be described later.

The actuator information generating part 154 generates stroke information indicating the stroke length of the fork shaft 92, based on sensor information from the actuator's rotation angle sensor 135. Note that in the present embodiment, a stroke sensor that (directly) detects the stroke length of an object (e.g., the fork shaft 92) driven by the actuator 74 may be provided or may not be provided. When a stroke sensor is not provided, a stroke length indicated by stroke information is derived from a parameter correlated with the stroke length such as the number of actuator revolutions. Specifically, for example, when the actuator's rotation angle sensor 135 is Hall ICs, the Hall ICs output pulses (e.g., pulses for respective three phases) obtained based on the rotation of an output shaft of the actuator 74. In this case, the actuator information generating part 154 can derive the direction of rotation of the screw shaft 722 (i.e., whether the moving direction of the fork shaft 92 is the X1-side or the X2-side) and the rotation angle of the screw shaft 722 (i.e., the stroke length of the fork shaft 92), based on the manner in which the pulses from the Hall ICs change.

The position information generating part 156 generates position information of the fork shaft 92, based on actuator information obtained by the actuator information generating part 154. Note that the position information of the fork shaft 92 may be represented by a distance from a shift reference position. For example, for the position information of the fork shaft 92, the position of the fork shaft 92 may be represented, for example, as a distance from a shift reference position, with the shift reference position being "point 0", the X1-side being "negative (−)", and the X2-side being "positive (+)".

The position information of the fork shaft 92 generated by the position information generating part 156 can be used for various types of control in the control device 100. For example, the position information of the fork shaft 92 can be used for the above-described transition process, etc. For example, the actuator control part 153 may perform feedback control of the stroke length of the fork shaft 92 in a transition process, based on the position information of the fork shaft 92.

When the required-gear detecting part 151 detects a gear change request, the gear change control part 157 performs gear change control. Specifically, the gear change control part 157 controls the motor 10 and the actuator 74 in cooperation with the motor control part 152 and the actuator control part 153 so as to achieve a required gear according to the gear change request.

Figure 6:
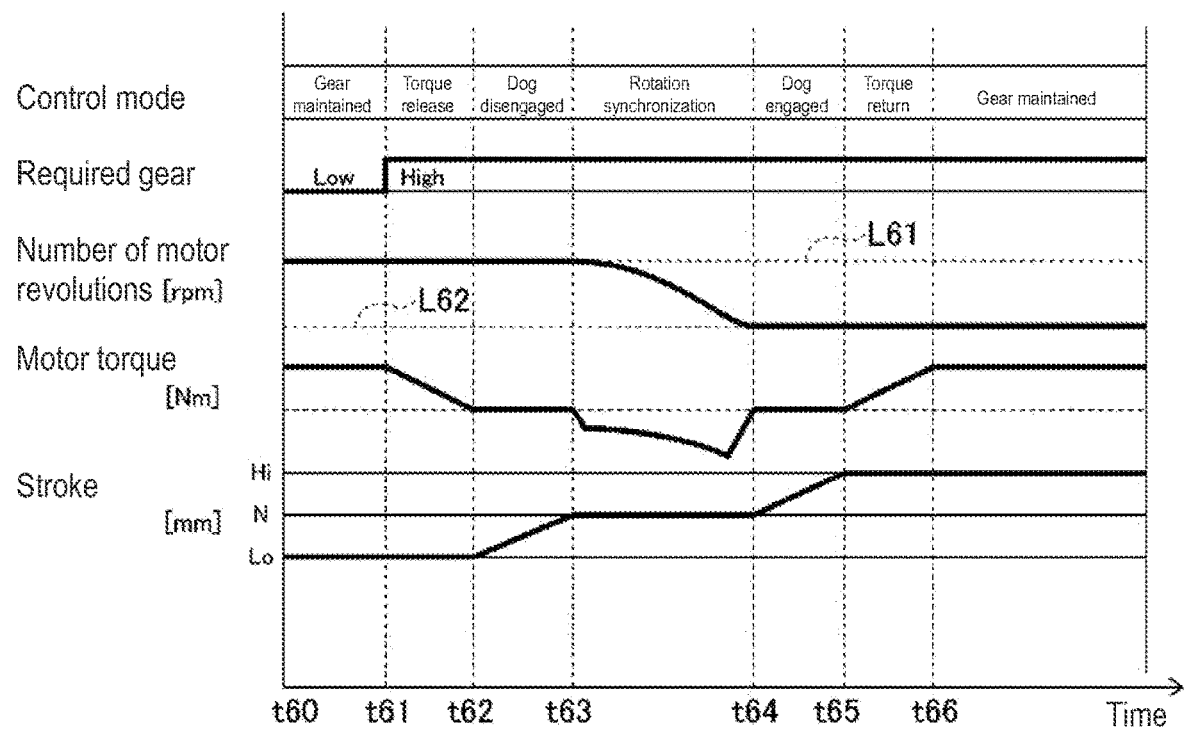
FIG. 6 is a timing chart schematically showing an example of gear change control.

FIG. 6 is a timing chart schematically showing an example of gear change control which is implemented by the gear change control part 157. FIG. 6 shows a time series of each of a control mode (a control mode according to gear change control), a required gear, the number of motor revolutions, motor torque, and stroke in this order from top to bottom. Note that for each parameter shown in FIG. 6, the required gear corresponds to a result of detection by the required-gear detecting part 151, the number of motor revolutions corresponds to sensor information from the number-of-motor-revolutions sensor 134, and the stroke corresponds to the stroke length of actuator information. "Hi" in the stroke corresponds to the above-described second meshed state, "Lo" corresponds to the above-described first meshed state, and "N" in the stroke corresponds to the above-described non-meshed state.

In the example shown in FIG. 6, the gear change control part 157 performs gear change control while switching the control mode between a "gear maintained" mode, a "torque release" mode, a "dog disengaged" mode, a "rotation synchronization" mode, a "dog engaged" mode, and a "torque return" mode.

Specifically, in the example shown in FIG. 6, at time point t60, the required gear is "Low" and it is a state in which the required gear is achieved ("gear maintained" mode). A gear change request occurs at time point t61, and the required gear changes from "Low" to "High". When a gear change request occurs, a "torque release" mode is implemented and the motor torque gradually decreases. When the motor torque decreases to a predetermined value, at time point t62, a "dog disengaged" mode is implemented, and a transition process from a first meshed state to a non-meshed state is performed, with the number of motor revolutions being synchronized with a Low synchronous number of revolutions L61. When the transition process from the first meshed state to the non-meshed state is completed, at time point t63, a "rotation synchronization" mode is implemented, and the number of motor revolutions is synchronized with a High synchronous number of revolutions L62. Note that during this period, the motor torque is determined by number-of-revolutions control. When the number of motor revolutions is synchronized with the High synchronous number of revolutions L62, at time point t64, a "dog engaged" mode is implemented, and a transition process from the non-meshed state to a second meshed state is performed. When the transition process from the non-meshed state to the second meshed state is completed, at time point t65, a "torque return" mode is implemented, and the motor torque gradually increases toward driver's required torque. When the motor torque returns to the driver's required torque, at time point t66, a "gear maintained" mode is implemented. Namely, the gear change control is completed and the control mode returns to the "gear maintained" mode. Note that in the "gear maintained" mode, the motor 10 is, as described above, controlled (torque-controlled) so as to achieve the driver's required torque.

In this manner, in the present embodiment, when the required gear is changed from "Low" to "High", in the "dog disengaged" mode, a transition process from a first meshed state to a non-meshed state is performed, and in the "dog engaged" mode, a transition process from the non-meshed state to a second meshed state is performed. Note that, though not shown, when the required gear is changed from "High" to "Low", reversely, in the "dog disengaged" mode, a transition process from a second meshed state to a non-meshed state is performed, and in the "dog engaged" mode, a transition process from the non-meshed state to a first meshed state is performed. In addition, though not shown, when the required gear is changed from "N" to "High", the "dog disengaged" mode is omitted, and in the "dog engaged" mode, a transition process from a non-meshed state to a second meshed state is performed. In addition, though not shown, when the required gear is changed from "N" to "Low", the "dog disengaged" mode is omitted, and in the "dog engaged" mode, a transition process from a non-meshed state to a first meshed state is performed.

Next, the actuator control part 153 will be described in detail in several different embodiments.

First Embodiment

As shown in FIG. 5, the actuator control part 153 includes a transition control mode switching part 1531, a feed-forward control part 1532, and a feedback control part 1533.

When a predetermined mode switching condition (hereinafter, also referred to as "FB start condition") holds true, the transition control mode switching part 1531 switches a transition control mode which is a control mode related to a transition process, from a feed-forward mode to a feedback mode. Specifically, when a transition process starts, the transition control mode switching part 1531 sets the transition control mode to the feed-forward mode, and thereafter, when the FB start condition holds true, the transition control mode switching part 1531 switches the transition control mode to the feedback mode. The FB start condition is any condition, but may be preferably adapted so as to be satisfied at a point in time when the lock ball 96 goes over the "projection" at the recessed part 920, 921, or 922 (a point in time when the lock ball 96 reaches the top), or immediately after the lock ball 96 goes over the "projection".

In addition, in the present embodiment, when a predetermined mode switching condition (hereinafter, also referred to as "FB end condition") further holds true, the transition control mode switching part 1531 switches the transition control mode from the feedback mode to an energization off mode. The FB end condition is any condition as long as the FB end condition is satisfied later than the FB start condition, but may be preferably adapted so as to be satisfied after the lock ball 96 goes over the "projection" at the recessed part 920, 921, or 922. The timing at which the FB end condition is satisfied is substantially the end timing of the transition process in terms of processing, but may be earlier than timing at which the lock ball 96 reaches the "depression" at the recessed part 920, 921, or 922, implementing a mechanical transition. This is because, as described above, when the lock ball 96 goes over the "projection" at the recessed part 920, 921, or 922, even if the drive current of the actuator 74 reaches "0", the lock ball 96 is drawn into a "depression" present ahead of the "projection".

In the feed-forward mode, the feed-forward control part 1532 performs feed-forward control of the actuator 74. Specifically, the feed-forward control part 1532 performs control so that the magnitude of a drive current applied to the actuator 74 reaches a predetermined value $I_{FF1}$. The predetermined value $I_{FF1}$ is set to a relatively high value so that movement of the fork shaft 92 starts promptly and the movement is promoted. For example, the predetermined value $I_{FF1}$ may correspond to the maximum value of a drive current applicable to the actuator 74.

In the feedback mode, the feedback control part 1533 performs feedback control of the actuator 74 so that the fork shaft 92 reaches a predetermined final target position. In the present embodiment, as an example, the feedback control part 1533 performs feedback control of the actuator 74 based on stroke information generated by the actuator information generating part 154, so that the stroke length of the fork shaft 92 reaches a predetermined target stroke length. In this case, the predetermined target stroke length corresponds to a distance from the position of the fork shaft 92 at the start of control to a predetermined final target position (a distance in the X-direction). In this case, the predetermined final target position is determined according to the type of a transition process. For example, in a case of a transition process from a non-meshed state to a first meshed state, the predetermined final target position corresponds to a position for the first meshed state, i.e., a position of the fork shaft 92 obtained when the lock ball 96 reaches the position $P_{Low}$. Likewise, in a case of a transition process from a first meshed state to a non-meshed state, the predetermined final target position corresponds to a position for the non-meshed state, i.e., a position of the fork shaft 92 obtained when the lock ball 96 reaches the position $P_N$.

Note that in a variant, equivalently, instead of stroke information, position information of the fork shaft 92 generated by the position information generating part 156 may be used. Namely, the feedback control part 1533 may perform feedback control of the actuator 74 based on position information of the fork shaft 92 generated by the position information generating part 156, so that the fork shaft 92 reaches a predetermined final target position.

Figure 7A:
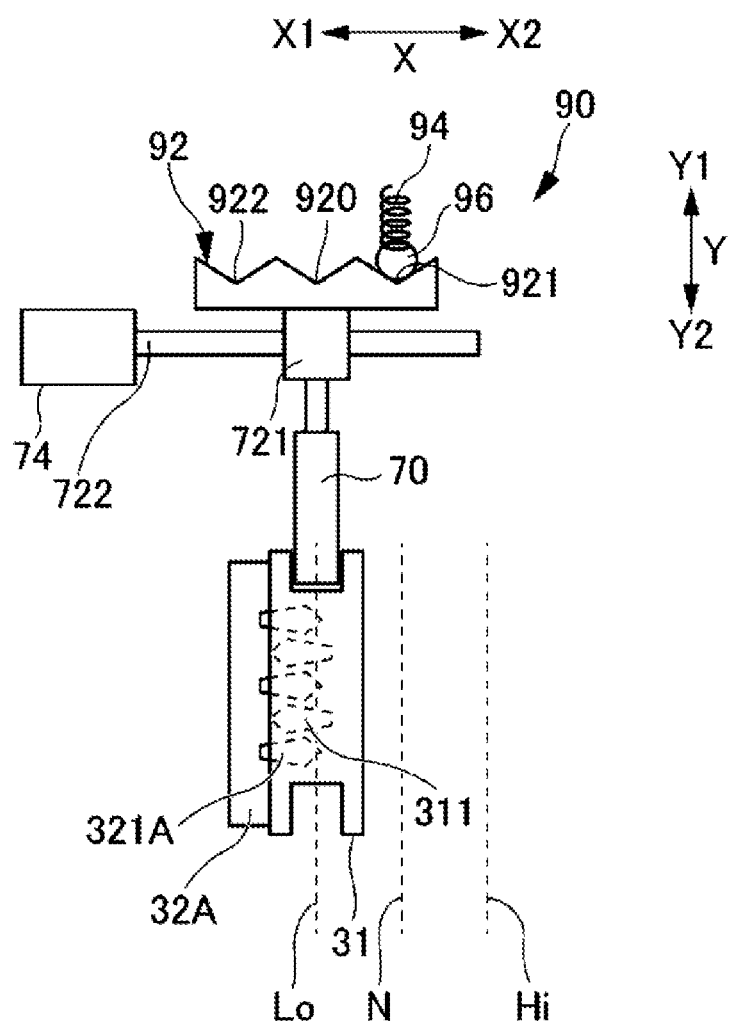
FIG. 7A is a diagram schematically showing a state for when a transition from a first meshed state to a non-meshed state starts.
Figure 7B:
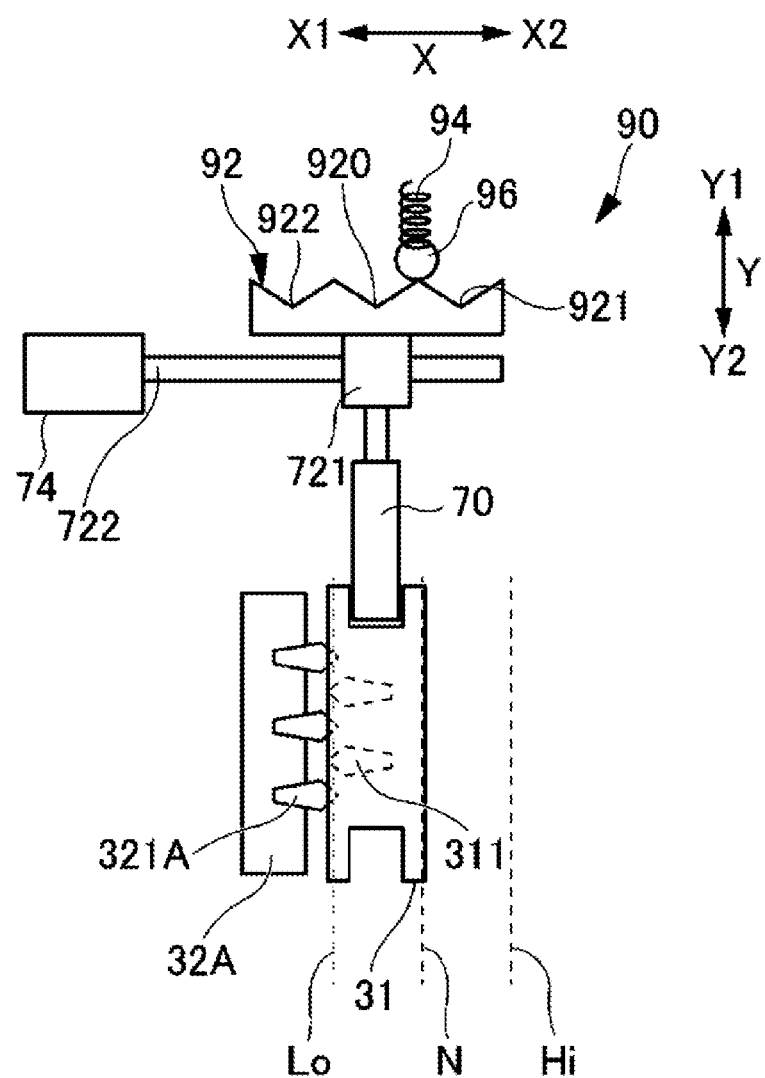
FIG. 7B is a diagram schematically showing a state for when an FB start condition holds true.
Figure 7C:
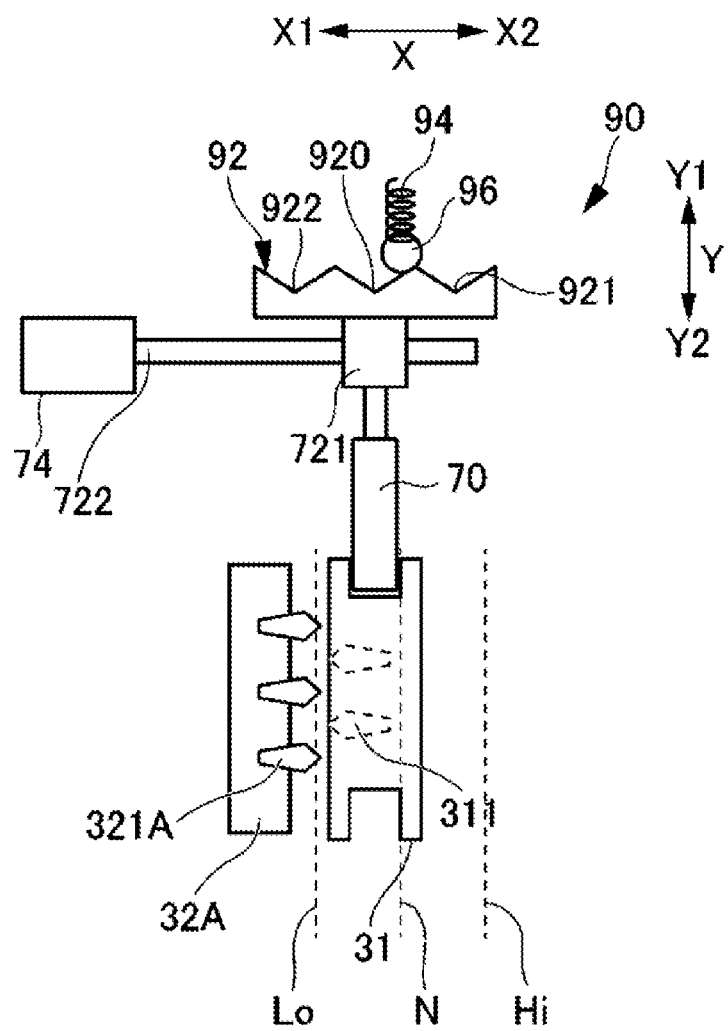
FIG. 7C is a diagram schematically showing a state for when an FB end condition holds true.
Figure 8:
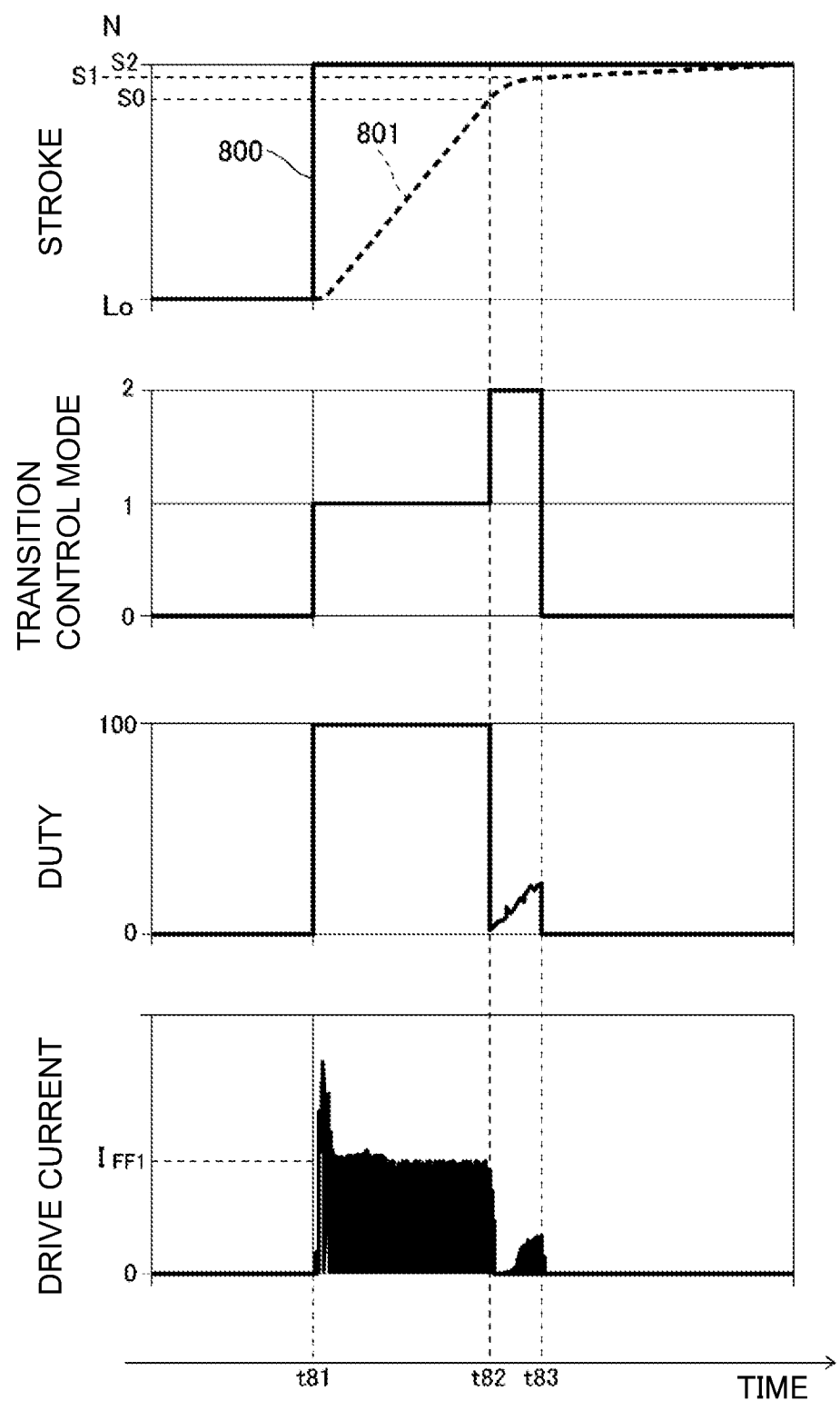
FIG. 8 is a timing chart according to an example of a transition process from a first meshed state to a non-meshed state.

Next, with reference to FIGS. 7A to 8, the operation of the actuator control part 153 will be further described.

FIGS. 7A to 7C are diagrams very schematically showing the shift detent mechanism 90, the first element 31, and the second element 32A in each positional relationship related to a transition from a first meshed state to a non-meshed state. FIGS. 7A to 7C very schematically show some tooth-like parts 311 of the first element 31 and some tooth-like parts 321A of the second element 32A for the sake of description. FIG. 8 is a timing chart for an example of a transition process from a first meshed state to a non-meshed state. FIG. 8 shows a time series of each of stroke, transition control mode, duty, and drive current (direct current) in this order from top to bottom. For the stroke, there are shown a time series 800 of an instruction stroke (instruction value) and a time series 801 of an actual stroke (e.g., a stroke length derived from the actuator's rotation angle sensor 135). In addition, for the transition control mode, "0" indicates the energization off mode, "1" indicates the feed-forward mode, and "2" indicates the feedback mode.

Although here a mode switching condition for a transition process from a first meshed state to a non-meshed state will be described with reference to FIGS. 7A to 8, the same may also be applied to other transition processes (e.g., a transition process from a second meshed state to a non-meshed state).

In FIG. 8, in a first meshed state shown in FIG. 7A, a transition process from the first meshed state to a non-meshed state starts from time point t81. At time point t81, as shown in FIG. 8, the feed-forward mode is formed, and the actuator 74 is feed-forward controlled so that the fork shaft 92 (and the first element 31 accordingly) moves toward the X2-side. Specifically, the duty is set to a maximum value (100%), and the drive current is controlled to the predetermined value $I_{FF1}$. Note that although in FIG. 8 the drive current overshoots at the start of feed-forward control, the control may be performed in a mode in which the overshoot does not occur.

When the feed-forward control in the feed-forward mode starts in this manner, the fork shaft 92 starts to move toward the X2-side, and as shown in FIG. 8, the stroke length (actual stroke) of the fork shaft 92 gradually increases with a relatively large increase gradient. Then, in FIG. 8, by the stroke length of the fork shaft 92 reaching a predetermined length S0 (an example of a first distance), the FB start condition is satisfied, and from that time point t82, the transition control mode switches from the feed-forward mode to the feedback mode.

FIG. 7B shows a state at time point t82 at which the stroke length of the fork shaft 92 has reached the predetermined length S0. In the present embodiment, as an example, as shown in FIG. 7B, time point t82 at which the stroke length of the fork shaft 92 has reached the predetermined length S0, i.e., time point t82 at which the transition control mode switches from the feed-forward mode to the feedback mode, corresponds to a point in time when the lock ball 96 has reached the top of a "projection" between the recessed part 921 and the recessed part 920 of the fork shaft 92. In this case, the predetermined length S0 corresponds to the distance $\Delta L_{L2}$ shown in FIG. 3.

When the transition control mode is switched to the feedback mode, the actuator 74 is controlled so that the stroke length of the fork shaft 92 reaches a predetermined length S2. The predetermined length S2 corresponds to a stroke length of the fork shaft 92 that is achieved when a transition from a first meshed state to a non-meshed state is made (a target stroke length for this transition process) and corresponds to the distance $\Delta L_{L2}$+the distance $\Delta L_{N1}$ shown in FIG. 3. Note that when the transition control mode is switched to the feedback mode, the duty significantly gets smaller than that for the feed-forward control, and accordingly, the drive current also significantly gets smaller than that for the feed-forward control. As a result, the increase gradient of the stroke length of the fork shaft 92 also decreases (i.e., the moving speed of the fork shaft 92 decreases). Then, in FIG. 8, by the stroke length of the fork shaft 92 reaching a predetermined length S1 (an example of a second distance), the FB end condition is satisfied, and from that time point t83, the transition control mode changes from the feedback mode to the energization off mode.

FIG. 7C shows a state at time point t83 at which the stroke length of the fork shaft 92 has reached the predetermined length S1. In the present embodiment, as an example, as shown in FIG. 7C, time point t83 at which the stroke length of the fork shaft 92 has reached the predetermined length S1, i.e., time point t83 at which the transition control mode switches from the feedback mode to the energization off mode, corresponds to a point in time when the lock ball 96 has gone over the top of the "projection" between the recessed part 921 and the recessed part 920 of the fork shaft 92 and moves toward a "depression". Note that the predetermined length S1 is shorter than the predetermined length S2 and longer than the predetermined length S0.

When the transition control mode is switched to the energization off mode, the duty is "0%" and the drive current applied to the actuator 74 is "0". Note, however, that as described above, by the action of the inclination of the recessed part 920 of the fork shaft 92 and the coil spring 94, the stroke length of the fork shaft 92 gradually increases with a relatively small increase gradient and reaches the predetermined length S2. In this manner, a transition from the first meshed state to the non-meshed state is implemented.

Note that although in the example shown in FIGS. 7A to 8, the FB start condition is satisfied by the stroke length of the fork shaft 92 reaching the predetermined length S0, the configuration is not limited thereto. For example, the FB start condition may be satisfied by the stroke length of the fork shaft 92 reaching the predetermined length S1. In this case, feedback control may be performed until the stroke length of the fork shaft 92 reaches the predetermined length S2, or the feedback control may end immediately before the stroke length of the fork shaft 92 reaches the predetermined length S2 (i.e., switching to the energization off mode may be implemented).

Meanwhile, since a transition process such as that described above is performed in gear change control, a reduction in the time required for the transition process is useful in terms of being able to reduce the time required for the gear change control, i.e., the time from when a gear change request occurs until a gear change is completed.

In this regard, according to the present embodiment, as described above, feed-forward control is performed immediately after starting a transition process, and thus, compared to a configuration in which feedback control is performed immediately after starting a transition process, the drive power of the actuator 74 can be increased from the start of the transition process. As a result, the start of a stroke (initial action) of the fork shaft 92 is promoted, enabling to achieve a reduction in the time required for the transition process.

In addition, according to the present embodiment, as described above, switching from the feed-forward mode to the feedback mode is performed during a transition process, and thus, compared to a configuration in which feed-forward control is performed until the fork shaft 92 reaches a predetermined final target position (i.e., a configuration in which in FIG. 8 feed-forward control is performed until the stroke length of the fork shaft 92 reaches the predetermined length S2), it becomes easy to allow the fork shaft 92 to reach the predetermined final target position in a mode in which overshoot in which the stroke length of the fork shaft 92 exceeds the predetermined length S2 is less likely to occur. As a result, according to the present embodiment, a reduction in the time required for the transition process can be consequently achieved.

As such, in the present embodiment, a reduction in the time required for a transition process, i.e., an improvement of the responsiveness of the shift detent mechanism 90, can be achieved. As a result, the shift detent mechanism 90 can allow the dog clutches 301 and 302 to work together with excellent responsiveness, enabling to achieve a reduction in the time required for gear change control.

Note that although in the present embodiment, when the FB start condition is satisfied, switching from the feed-forward mode to the feedback mode is performed, the configuration is not limited thereto. For example, when a predetermined mode switching condition corresponding to the above-described FB start condition is satisfied, switching from the feed-forward mode to the energization off mode may be performed. Alternatively, even when the predetermined mode switching condition corresponding to the above-described FB start condition is satisfied, the feed-forward mode may be maintained, and when a predetermined mode switching condition corresponding to the above-described FB end condition is satisfied, switching from the feed-forward mode to the energization off mode may be performed. In these cases, too, as described above, after switching to the energization off mode, the fork shaft 92 can promptly reach a predetermined final target position by the action of the inclination of the recessed part 920 of the fork shaft 92 and the coil spring 94.

Alternatively, when the predetermined mode switching condition corresponding to the above-described FB start condition is satisfied, switching from the feed-forward mode (here, referred to as "first feed-forward mode" for the sake of distinction) to another feed-forward mode (hereinafter, referred to as "second feed-forward mode") may be performed. In this case, in the second feed-forward mode, control is performed such that the magnitude of a drive current applied to the actuator 74 is smaller than that in the first feed-forward mode. Specifically, in the first feed-forward mode, the feed-forward control part 1532 performs control so that the magnitude of a drive current applied to the actuator 74 reaches the predetermined value $I_{FF1}$, whereas in the second feed-forward mode, the feed-forward control part 1532 performs control so that the magnitude of a drive current applied to the actuator 74 reaches a predetermined value $I_{FF2}$. The predetermined value $I_{FF2}$ is significantly smaller than the predetermined value $I_{FF1}$ and is, for example, a value at which the duty is less than 50%, more preferably, a value at which the duty is less than 30%. In this case, too, while the start of a stroke (initial action) of the fork shaft 92 is promoted, it becomes easy to allow the fork shaft 92 to reach a predetermined final target position in a mode in which overshoot is less likely to occur. Note that in this case, the second feed-forward mode is performed instead of the above-described feedback mode, and thus the energization off mode is also performed, but the configuration is not limited thereto. For example, equivalently, in the second feed-forward mode, the predetermined value $I_{FF2}$ may gradually decrease toward 0. Specifically, in the second feed-forward mode, the predetermined value $I_{FF2}$ may gradually decrease so as to reach 0 at a point in time when the fork shaft 92 reaches the predetermined final target position, or before that point in time.

Next, with reference to FIG. 9, exemplary operation of the control device 100 related to a transition process will be described. In the following processing flowchart, the processing order of steps may be changed as long as a relationship between the input and output of each step is not broken.

At step S700, the control device 100 performs a process of obtaining/generating various types of information. Specifically, the control device 100 obtains various types of sensor information by the sensor information obtaining part 150, detects a required gear by the required-gear detecting part 151, generates stroke information by the actuator information generating part 154, and generates position information of the fork shaft 92 by the position information generating part 156.

At step S702, the control device 100 determines whether a transition process flag F0 is "0". The transition process flag F0 is "1" in a state in which a transition process is being performed, and is otherwise "0". An initial value (a value at the start of the vehicle) of the transition process flag F0 is "0". If the result of the determination is "YES", then processing proceeds to step S704, and otherwise proceeds to step S710.

At step S704, the control device 100 determines whether a start condition for a transition process holds true. The start condition for a transition process is satisfied, for example, when a control mode for gear change control is set to the "dog disengaged" mode or the "dog engaged" mode (see FIG. 6). If the result of the determination is "YES", then processing proceeds to step S706, and otherwise the process for this cycle ends.

At step S706, the control device 100 sets the transition process flag F0 to "1" by the transition control mode switching part 1531.

At step S707, the control device 100 sets the transition control mode to the feed-forward mode and sets an FF flag F1 to "1" by the transition control mode switching part 1531. The FF flag F1 is "1" in a state in which the transition control mode is the feed-forward mode, and is otherwise "0". An initial value (a value at the start of the vehicle) of the FF flag F1 is "0".

At step S708, the control device 100 starts feed-forward control by the feed-forward control part 1532. Namely, the feed-forward control part 1532 applies a drive current with the predetermined value $I_{FF1}$ to the actuator 74 in a mode in which the output shaft of the actuator 74 rotates in a direction of rotation determined based on a meshed state of a transition destination.

At step S710, the control device 100 determines whether the FF flag F1 is "1". If the result of the determination is "YES", then processing proceeds to step S712, and otherwise proceeds to step S720.

At step S712, the control device 100 determines, by the transition control mode switching part 1531, whether the FB start condition holds true, based on stroke information obtained at step S700. For example, in a case of the example shown in FIG. 8, the transition control mode switching part 1531 determines, based on the stroke information obtained at step S700, whether the stroke length of the fork shaft 92 from the start of the feed-forward control at step S708 has reached the predetermined length S0. If the result of the determination is "YES", then processing proceeds to step S714, and otherwise proceeds to step S718.

At step S714, the control device 100 starts feedback control by the feedback control part 1533.

At step S716, the control device 100 sets the transition control mode to the feedback mode and resets the FF flag F1 to "0" by the transition control mode switching part 1531.

At step S718, the control device 100 continues the feed-forward control started at step S708.

At step S720, the control device 100 determines, by the transition control mode switching part 1531, whether the FB end condition holds true, based on stroke information obtained at step S700. For example, in a case of the example shown in FIG. 8, the transition control mode switching part 1531 determines, based on the stroke information obtained at step S700, whether the stroke length of the fork shaft 92 from the start of the feed-forward control at step S708 has reached the predetermined length S1. If the result of the determination is "YES", then processing proceeds to step S721, and otherwise proceeds to step S726.

At step S721, the control device 100 sets the transition control mode to the energization off mode by the transition control mode switching part 1531. In this manner, before it is determined that the stroke length of the fork shaft 92 has reached a predetermined target stroke length, the feedback control ends and the operation of the actuator 74 stops.

At step S722, the control device 100 determines, based on the stroke information obtained at step S700, whether the stroke length of the fork shaft 92 has reached the predetermined target stroke length. Namely, the control device 100 determines whether the fork shaft 92 has reached a predetermined final target position. If the result of the determination is "YES", then processing proceeds to step S724. On the other hand, if the result of the determination is "NO", then the process for this cycle ends.

At step S724, the control device 100 ends the transition process and resets the transition process flag F0 to "0".

At step S726, the control device 100 continues the feedback control started at step S714.

Figure 9:
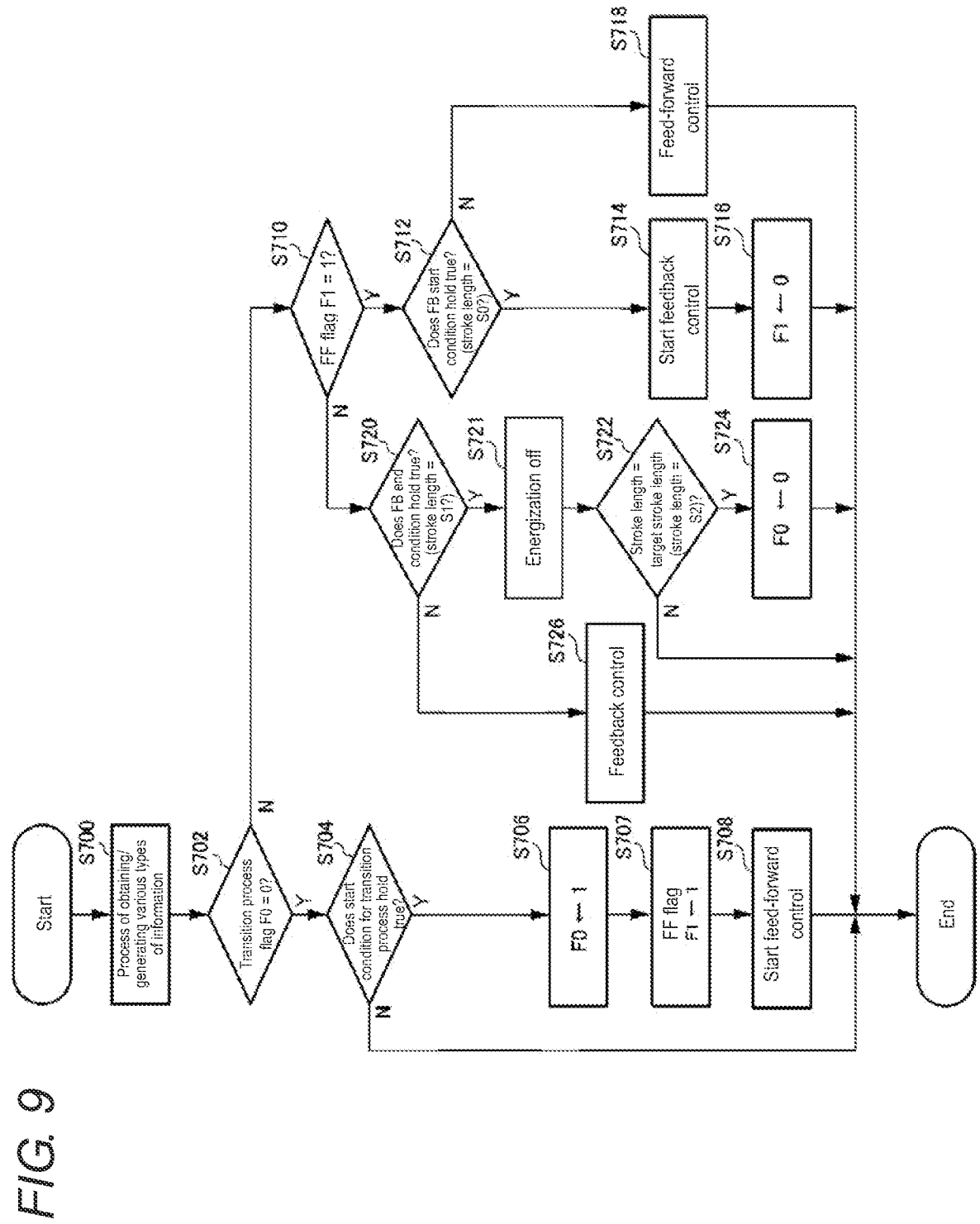
FIG. 9 is a schematic flowchart showing an example of a process performed by the control device in relation to a transition process of the first embodiment.

According to the process shown in FIG. 9, when the start condition for a transition process holds true, first, feed-forward control is performed, and then feedback control is performed, and thus, while the start of a stroke (initial action) of the fork shaft 92 is promoted, it becomes easy to allow the fork shaft 92 to reach a predetermined final target position in a mode in which overshoot is less likely to occur.

Note that in the present embodiment, as described above, as an example, the distance $\Delta L_{N2}$=the distance $\Delta L_{H1}$=the distance $\Delta L_{L2}$=the distance $\Delta L_{N1}$, and thus, the process shown in FIG. 9 can be applied to any of a transition process from a first meshed state to a non-meshed state, a transition process from a non-meshed state to a first meshed state, a transition process from a non-meshed state to a second meshed state, and a transition process from a second meshed state to a non-meshed state. Note that when the distance $\Delta L_{N2}$=the distance $\Delta L_{H1}$=the distance $\Delta L_{L2}$=the distance $\Delta L_{N1}$ does not hold true, the value of each of the predetermined length S0, the predetermined length S1, and the predetermined length S2 just differs accordingly, and the flow of the process itself is the same. For example, in a case of a transition process from a non-meshed state to a first meshed state, the predetermined length S0=the distance $\Delta L_{N1}$, the predetermined length S2=the distance $\Delta L_{L2}$+the distance $\Delta L_{N1}$, and the predetermined length S1 may be set likewise so as to be shorter than the predetermined length S2 and longer than the predetermined length S0. In addition, in a case of a transition process from a non-meshed state to a second meshed state, the predetermined length S0=the distance $\Delta L_{N2}$, the predetermined length S2=the distance $\Delta L_{H1}$+the distance $\Delta L_{N2}$, and the predetermined length S1 may be set likewise so as to be shorter than the predetermined length S2 and longer than the predetermined length S0.

Second Embodiment

In the following, components that may be substantially the same as those in the first embodiment are given the same reference signs and description thereof may be omitted. The first meshed state or the second meshed state may be hereinafter simply referred to as "meshed state" where they are not particularly distinguished from each other.

Figure 10:
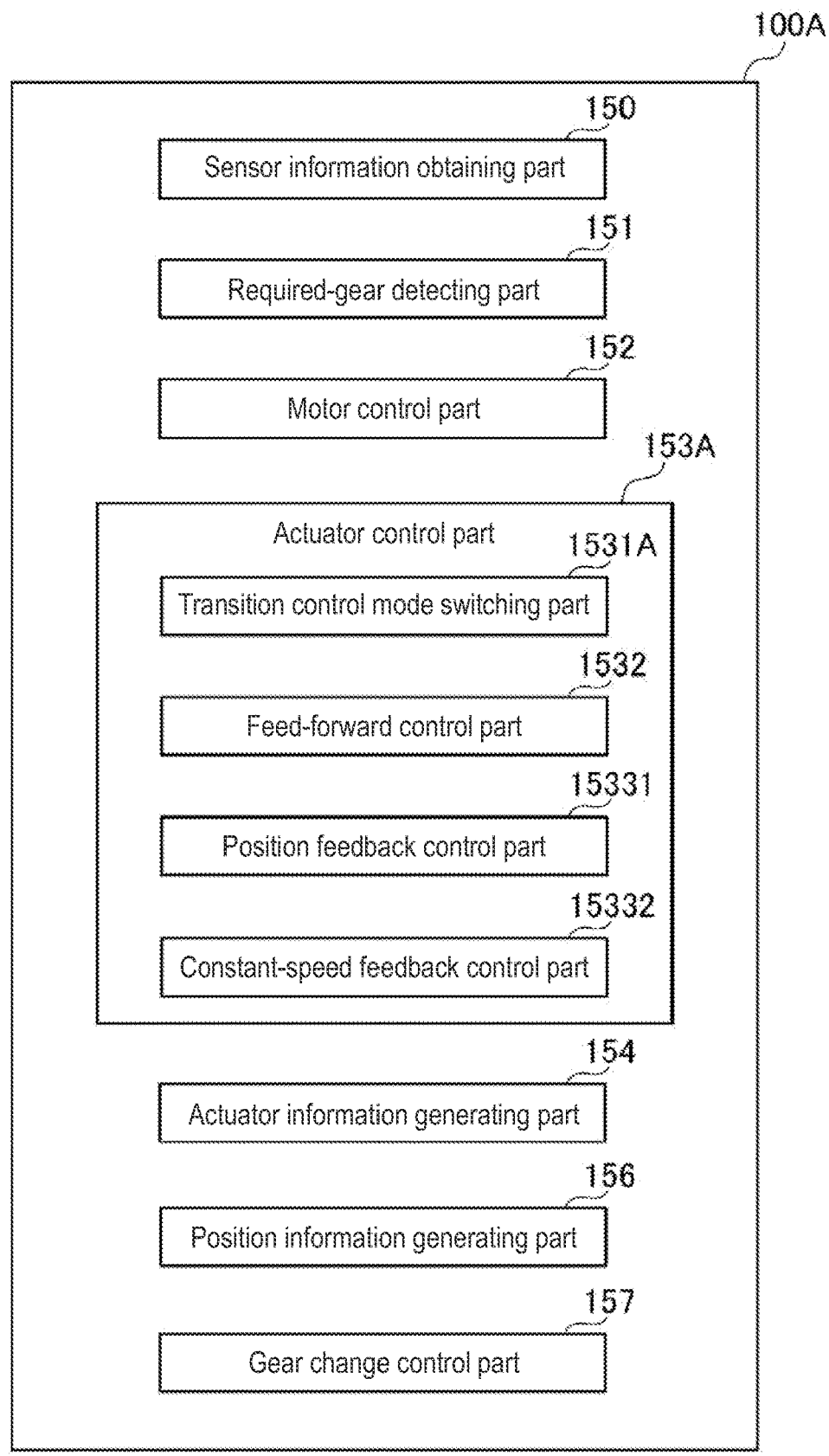
FIG. 10 is a schematic diagram showing an example of functional configurations of a control device of a second embodiment.

FIG. 10 is a schematic diagram showing an example of functional configurations of a control device 100A of a second embodiment. In the following description of the second embodiment, portions that differ from the control device 100 of the above-described first embodiment will be mainly described, and other portions may be the same as those of the control device 100 of the above-described first embodiment unless otherwise particularly mentioned.

The control device 100A of the present embodiment differs from the control device 100 of the above-described first embodiment in that the actuator control part 153 is replaced by an actuator control part 153A.

As shown in FIG. 10, the actuator control part 153A of the present embodiment includes a transition control mode switching part 1531A, a feed-forward control part 1532, a position feedback control part 15331, and a constant-speed feedback control part 15332.

The transition control mode switching part 1531A differs from the transition control mode switching part 1531 of the above-described first embodiment in a method of switching between transition control modes which are control modes related to a transition process. Specifically, in the transition control mode switching part 1531 of the above-described first embodiment, the method of switching between transition control modes is the same for a transition process from a meshed state (a first meshed state or a second meshed state) to a non-meshed state and a transition process from a non-meshed state to a meshed state. On the other hand, in the transition control mode switching part 1531A of the present embodiment, the method of switching between transition control modes differs between a transition process from a meshed state to a non-meshed state and a transition process from a non-meshed state to a meshed state.

Specifically, in a transition process from a meshed state to a non-meshed state, as with the transition control mode switching part 1531 of the above-described first embodiment, when the transition process starts, the transition control mode switching part 1531A sets the transition control mode to the feed-forward mode, and thereafter, when the FB start condition holds true, the transition control mode switching part 1531A switches the transition control mode to a position feedback mode. The FB start condition is any condition, but may be preferably adapted so as to be satisfied at a point in time when the lock ball 96 goes over the "projection" at the recessed part 920, 921, or 922 (a point in time when the lock ball 96 reaches the top), or immediately after the lock ball 96 goes over the "projection".

Thereafter, when a predetermined mode switching condition (hereinafter, also referred to as "position FB end condition" for the sake of distinction) holds true, the transition control mode switching part 1531A switches the transition control mode from the position feedback mode to the energization off mode. The position FB end condition is any condition as long as the position FB end condition is satisfied later than the FB start condition, but may be preferably adapted so as to be satisfied after the lock ball 96 goes over the "projection" at the recessed part 920, 921, or 922. The timing at which the position FB end condition is satisfied is substantially the end timing of the transition process in terms of processing. Note that a preferred example of the position FB end condition will be described later.

In a transition process from a non-meshed state to a meshed state, when the transition process starts, the transition control mode switching part 1531A sets the transition control mode to a constant-speed feedback mode, and thereafter, when a predetermined mode switching condition (hereinafter, also referred to as "speed FB end condition" for the sake of distinction) holds true, the transition control mode switching part 1531A switches the transition control mode from the constant-speed feedback mode to the energization off mode.

In this manner, in the present embodiment, unlike the above-described first embodiment, in a transition process from a non-meshed state to a meshed state, the feed-forward mode is not formed, but instead, the constant-speed feedback mode is formed.

The position feedback control part 15331 performs position feedback control (an example of second feedback control) in the position feedback mode. Specifically, the position feedback control part 15331 fixes a target position as a predetermined final target position (an example of a target value), and performs feedback control of the actuator 74 so that the fork shaft 92 reaches the predetermined final target position. In the present embodiment, as an example, the position feedback control part 15331 performs feedback control of the actuator 74 based on stroke information generated by the actuator information generating part 154, so that the stroke length of the fork shaft 92 reaches a predetermined final target stroke length. In this case, the predetermined final target stroke length corresponds to a distance from the position of the fork shaft 92 at the start of control to a predetermined final target position (a distance in the X-direction). As such, the operation of the position feedback control part 15331 may be the same as the operation of the feedback control part 1533 of the above-described first embodiment which is implemented in a transition process from a meshed state to a non-meshed state.

The constant-speed feedback control part 15332 performs constant-speed feedback control (an example of first feedback control) in the constant-speed feedback mode. Specifically, the constant-speed feedback control part 15332 performs feedback control of the actuator 74 so that the fork shaft 92 reaches a predetermined final target position, while changing, every control cycle, a target position (an example of a target value) in a direction in which the target position approaches the predetermined final target position. In the present embodiment, as an example, the constant-speed feedback control part 15332 performs feedback control of the actuator 74 based on stroke information generated by the actuator information generating part 154, so that the increase speed of the stroke length of the fork shaft 92 (the amount of increase in stroke length per unit time) has a constant value.

In this case, the constant-speed feedback control part 15332 performs feedback control of the actuator 74 based on stroke information generated by the actuator information generating part 154, so that a stroke length of the fork shaft 92 indicated by the stroke information is a predetermined target stroke length set for each control cycle. Note, however, that in this case, the predetermined target stroke length corresponds to a distance obtained by dividing a distance from the position of the fork shaft 92 at the start of control to a predetermined final target position (a distance in the X-direction) by a predetermined number, and may be defined in advance. At this time, the predetermined number may correspond to the number of control cycles implemented in the constant-speed feedback mode. Note that in this case, the time required for the constant-speed feedback mode may have a fixed value.

Note that in a variant, equivalently, instead of stroke information, position information of the fork shaft 92 generated by the position information generating part 156 may be used. Namely, the constant-speed feedback control part 15332 may perform feedback control of the actuator 74 based on position information of the fork shaft 92 generated by the position information generating part 156, so that the position information of the fork shaft 92 follows a target position set for each control cycle up to a predetermined final target position. In this case, the target position set for each control cycle corresponds to a position after movement for each control cycle for a case of moving at a constant speed from the position of the fork shaft 92 at the start of control to the predetermined final target position, and may be defined in advance.

Figure 11A:
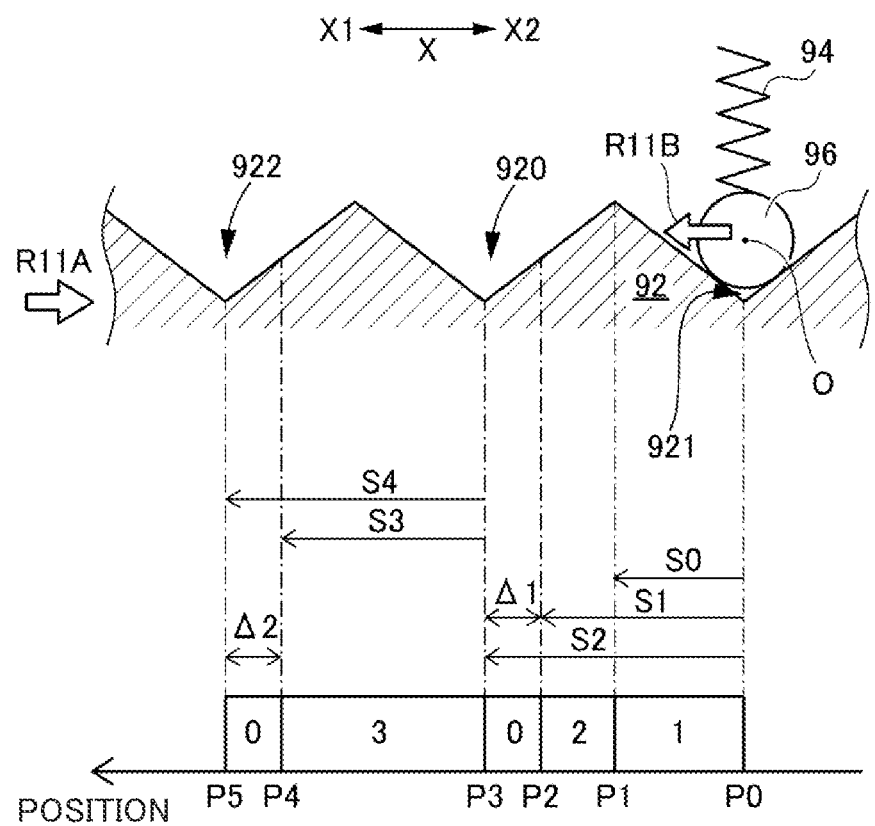
FIG. 11A is a diagram for describing a relationship between changes in transition control mode and a shift detent mechanism, for a transition from a first meshed state to a non-meshed state and a subsequent transition from the non-meshed state to a second meshed state.
Figure 11B:
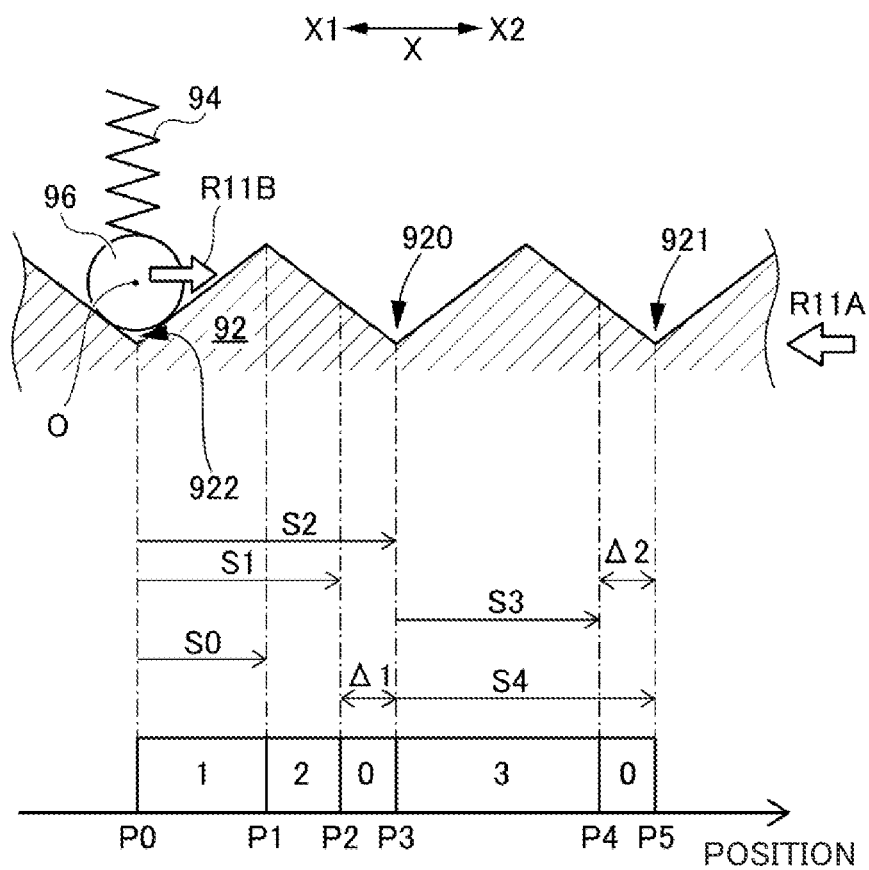
FIG. 11B is a diagram for describing a relationship between changes in transition control mode and the shift detent mechanism, for a transition from a second meshed state to a non-meshed state and a subsequent transition from the non-meshed state to a first meshed state.
Figure 12:
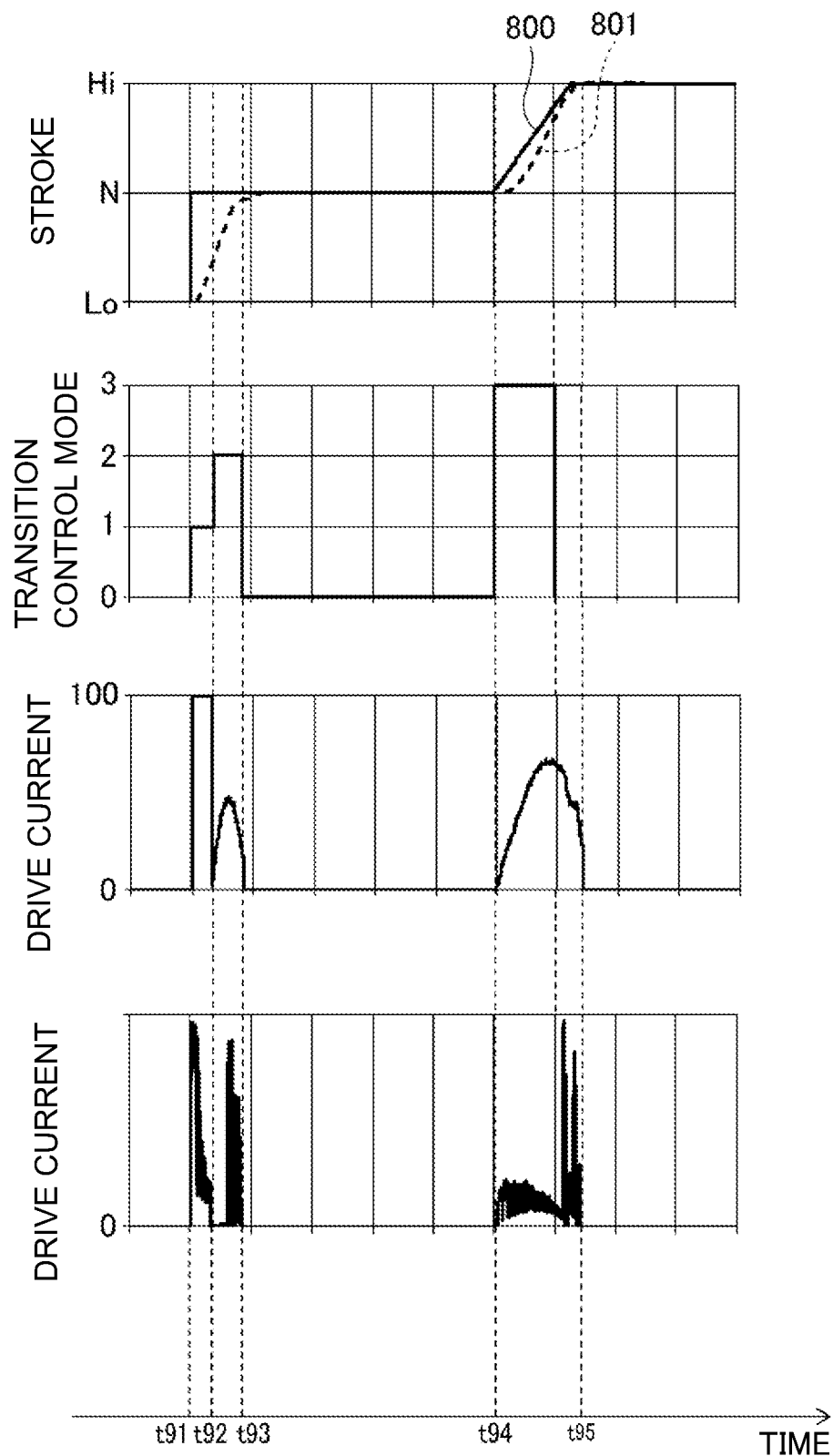
FIG. 12 is a timing chart for an example of a transition process for a transition from a first meshed state to a non-meshed state and a subsequent transition from the non-meshed state to a second meshed state.

Next, with reference to FIGS. 11A to 12, the operation of the actuator control part 153A will be further described.

FIG. 11A is a diagram for describing a relationship between changes in transition control mode and the shift detent mechanism 90, for a transition from a first meshed state to a non-meshed state and a subsequent transition from the non-meshed state to a second meshed state. FIG. 11B is a diagram for describing a relationship between changes in transition control mode and the shift detent mechanism 90, for a transition from a second meshed state to a non-meshed state and a subsequent transition from the non-meshed state to a first meshed state. FIGS. 11A and 11B very schematically show, for the sake of description, a positional relationship between the lock ball 96 of the shift detent mechanism 90 and the fork shaft 92 for the first meshed state. FIG. 12 is a timing chart for an example of a transition process for a transition from a first meshed state to a non-meshed state and a subsequent transition from the non-meshed state to a second meshed state. FIG. 12 shows a time series of each of stroke, transition control mode, duty, and drive current (direct current) in this order from top to bottom. For the stroke, there are shown a time series 800 of an instruction stroke (instruction value) and a time series 801 of an actual stroke (e.g., a stroke length derived from the actuator's rotation angle sensor 135). In addition, for the transition control mode, "0" indicates the energization off mode, "1" indicates the feed-forward mode, "2" indicates the position feedback mode, and "3" indicates the constant-speed feedback mode.

Although here mode switching conditions for a transition process from a first meshed state to a non-meshed state and a subsequent transition process from the non-meshed state to a second meshed state will be described with reference to FIGS. 11A and 12, transition processes for a reverse case (i.e., a transition from a second meshed state to a non-meshed state and a subsequent transition process from the non-meshed state to a first meshed state) may also be substantially the same, except that the transition processes have a reverse relationship as shown in FIG. 11B.

In FIGS. 11A and 12, relative movement of the lock ball 96 with respect to the fork shaft 92 in a direction indicated by an arrow R11B in FIG. 11A will be described in chronological order. At the top of FIG. 11A there is very schematically shown a positional relationship between the lock ball 96 of the shift detent mechanism 90 and the fork shaft 92, and at the bottom of FIG. 11A there are shown transition control modes for sections defined at respective positions, in association with positions P0 to P5 located along the fork shaft 92 with reference to a center O of the lock ball 96. In addition, as with FIG. 12, for the transition control mode, "0" indicates the energization off mode, "1" indicates the feed-forward mode, "2" indicates the position feedback mode, and "3" indicates the constant-speed feedback mode.

First, when a transition process from a first meshed state to a non-meshed state starts, in the first meshed state in the position P0, from time point t91, as shown in FIG. 12, the feed-forward mode is formed, and the actuator 74 is feed-forward controlled so that the fork shaft 92 (and the first element 31 accordingly) moves toward the X2-side (see an arrow R11A). In this case, the duty is set to a maximum value (100%).

When the feed-forward control in the feed-forward mode starts in this manner, the fork shaft 92 starts to move toward the X2-side, and as shown in FIG. 12, the stroke length (actual stroke) of the fork shaft 92 gradually increases with a relatively large increase gradient. Then, in FIG. 12, the FB start condition is satisfied in the position P1 (a position in which the stroke length of the fork shaft 92 reaches a predetermined length S0), and from that time point t92, the transition control mode switches from the feed-forward mode to the position feedback mode.

In the present embodiment, as an example, time point t92 at which the transition control mode switches from the feed-forward mode to the position feedback mode corresponds to a point in time when the lock ball 96 has reached the top of a "projection" between the recessed part 921 and the recessed part 920 of the fork shaft 92.

When the transition control mode is switched to the position feedback mode, the actuator 74 is feedback-controlled by the position feedback control part 15331. Accordingly, the increase gradient of the stroke length of the fork shaft 92 also decreases (i.e., the moving speed of the fork shaft 92 decreases). Then, in FIG. 12, the position FB end condition is satisfied in the position P2 (a position in which the stroke length of the fork shaft 92 reaches a predetermined length S1), and from that time point t93, the transition control mode changes from the position feedback mode to the energization off mode.

The position P2 corresponds to a point in time when the lock ball 96 has gone over the top of the "projection" between the recessed part 921 and the recessed part 920 of the fork shaft 92 and moves toward a "depression" at the recessed part 920. Note that the predetermined length S1 is shorter than a predetermined length S2 and longer than the predetermined length S0. A preferred example of a difference Δ1 between the predetermined length S2 and the predetermined length S1 will be described later.

When the transition control mode is switched to the energization off mode, the duty is "0%" and the drive current applied to the actuator 74 is "0". Note, however, that as described above, by the action of the inclination of the recessed part 920 of the fork shaft 92 and the coil spring 94, the stroke length of the fork shaft 92 gradually increases with a relatively small increase gradient and reaches the predetermined length S2 (the position P3 which is a predetermined final target position). In this manner, a transition from the first meshed state to the non-meshed state is implemented.

Thereafter, when a transition from the first meshed state to the non-meshed state is implemented, the rotation synchronization mode is formed (see FIG. 6), and when the rotation synchronization mode ends, a transition process from the non-meshed state to the second meshed state starts.

When a transition process from the non-meshed state to a second meshed state starts, in the non-meshed state in the position P3, from time point t94, as shown in FIG. 12, the constant-speed feedback mode is formed, and the actuator 74 is feedback-controlled by the constant-speed feedback control part 15332 so that the fork shaft 92 (and the first element 31 accordingly) moves toward the X2-side (see the arrow R11A). Then, in FIG. 12, the speed FB end condition is satisfied in the position P4 (a position in which the stroke length of the fork shaft 92 reaches a predetermined length S3), and from that time point t95, the transition control mode changes from the constant-speed feedback mode to the energization off mode.

As with the above-described position P2, the position P4 corresponds to a point in time when the lock ball 96 has gone over the top of a "projection" of the fork shaft 92 and moves toward a "depression". Note that the predetermined length S3 is shorter than a predetermined length S4. Note that a difference 42 between the predetermined length S3 and the predetermined length S4 is the same as the difference Δ1 between the predetermined length S2 and the predetermined length S1, but may be different from the difference Δ1. A preferred example of the difference 42 between the predetermined length S3 and the predetermined length S4 will be described later.

When the transition control mode switches from the constant-speed feedback mode to the energization off mode at time point t95, the duty is "0%", but as described above, by the action of the inclination of the recessed part 922 of the fork shaft 92 and the coil spring 94, the stroke length of the fork shaft 92 gradually increases with a relatively small increase gradient and reaches the predetermined length S4 (the position P5 which is a predetermined final target position). In this manner, a transition from the non-meshed state to the second meshed state is implemented.

As such, in the present embodiment, too, as with the above-described first embodiment, as described above, feed-forward control is performed immediately after starting a transition process for a transition from a meshed state to a non-meshed state, and thus, compared to a configuration in which feedback control is performed immediately after starting a transition process, the drive power of the actuator 74 can be increased from the start of the transition process. As a result, the start of a stroke (initial action) of the fork shaft 92 is promoted, enabling to achieve a reduction in the time required for the transition process.

In addition, according to the present embodiment, as described above, switching from the feed-forward mode to the position feedback mode is performed during a transition process from a meshed state to a non-meshed state, and thus, compared to a configuration in which feed-forward control is performed until the fork shaft 92 reaches a predetermined final target position (i.e., a configuration in which in FIG. 12 feed-forward control is performed until the stroke length of the fork shaft 92 reaches the predetermined length S1 or the predetermined length S2), it becomes easy to allow the fork shaft 92 to reach the predetermined final target position in a mode in which overshoot in which the stroke length of the fork shaft 92 exceeds the predetermined length S2 is less likely to occur. As a result, according to the present embodiment, a reduction in the time required for the transition process can be consequently achieved.

As such, in the present embodiment, too, for a transition from a meshed state to a non-meshed state, a reduction in the time required for a transition process, i.e., an improvement of the responsiveness of the shift detent mechanism 90, can be achieved. As a result, the shift detent mechanism 90 can allow the dog clutches 301 and 302 to work together with excellent responsiveness, enabling to achieve a reduction in the time required for gear change control.

In addition, according to the present embodiment, switching from the position feedback mode to the energization off mode is performed in the middle of a transition process from a meshed state to a non-meshed state. Namely, before completing a transition from the meshed state to the non-meshed state, position feedback control by the position feedback control part 15331 ends and the operation of the actuator 74 stops (the drive current reaches 0).

Meanwhile, though more details will be described later, stroke information used in the position feedback mode (the constant-speed feedback mode as well) is, as described above, generated by the actuator information generating part 154 based on sensor information from the actuator's rotation angle sensor 135. The sensor information from the actuator's rotation angle sensor 135 has resolution and can have errors (e.g., offsets) unique to the sensor. Namely, the sensor information from the actuator's rotation angle sensor 135 has a certain degree of error range. Hence, when it is determined based on stroke information whether a predetermined final target position has been reached, and feedback control is performed until the predetermined final target position has been reached, it is likely to be difficult to allow the position of the lock ball 96 to stably converge to the position of a "depression" of the fork shaft 92 corresponding to the predetermined final target position, due to an error component included in the stroke information (an error component due to the error range of the sensor information from the actuator's rotation angle sensor 135). Namely, upon converging the position of the lock ball 96 within the recessed parts 920, 921, and 922 of the fork shaft 92, it is likely to be difficult to increase the stability thereof (hereinafter, also simply referred to as "convergence stability").

On the other hand, according to the present embodiment, before completing a transition from a meshed state to a non-meshed state, position feedback control by the position feedback control part 15331 ends and the operation of the actuator 74 stops, and thus, it is possible to stably converge the position of the lock ball 96 within the recessed parts 920, 921, and 922 of the fork shaft 92 to the position of a "depression" of the fork shaft 92. Namely, it is possible to increase the convergence stability.

More specifically, when the above-described difference Δ1 between the predetermined length S2 and the predetermined length S1 is greater than or equal to an error component included in stroke information, the influence of the error component can be substantially eliminated. Alternatively, even when the above-described difference Δ1 between the predetermined length S2 and the predetermined length S1 is less than the error component included in the stroke information, the influence of the error component can be reduced by an amount corresponding to the difference Δ1. As a result, according to the present embodiment, the possibility of a reduction in convergence stability due to an error component included in stroke information can be reduced.

Here, as can be seen from the above-described description, too, the above-described difference Δ1 between the predetermined length S2 and the predetermined length S1 is preferably greater than or equal to an error component included in stroke information. In this case, the influence of the error component can be substantially eliminated, and thus, the possibility of a reduction in convergence stability due to the error component included in the stroke information can be substantially eliminated.

Figure 13A:
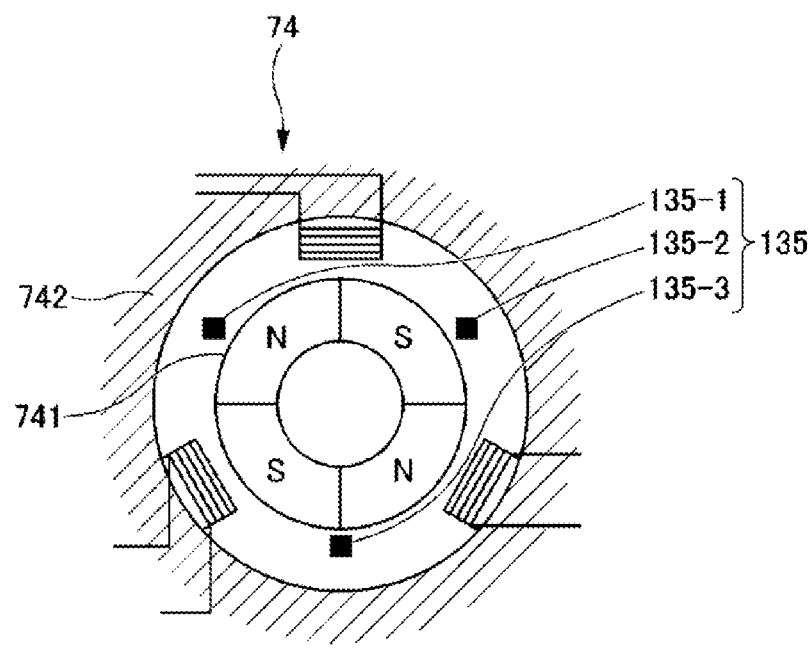
FIG. 13A is an illustrative diagram of disposition of an actuator's rotation angle sensor.
Figure 13B:
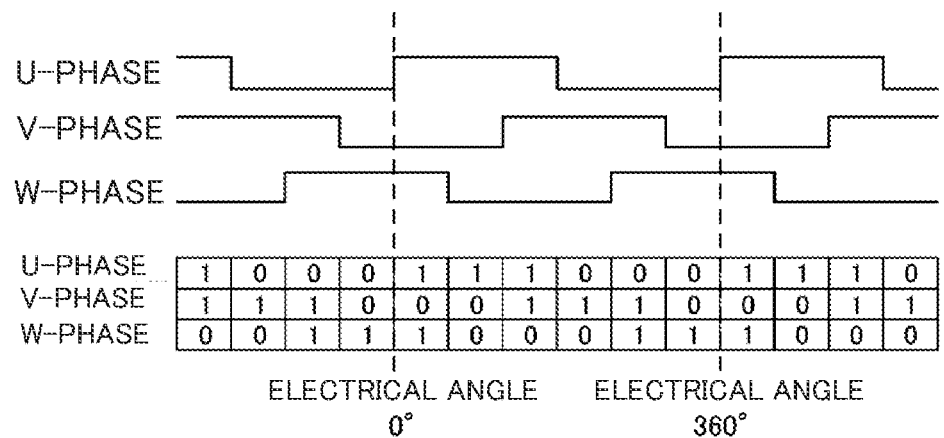
FIG. 13B is a diagram showing output waveforms (and output signals based on the output waveforms) from the actuator's rotation angle sensor upon forward rotation.
Figure 13C:
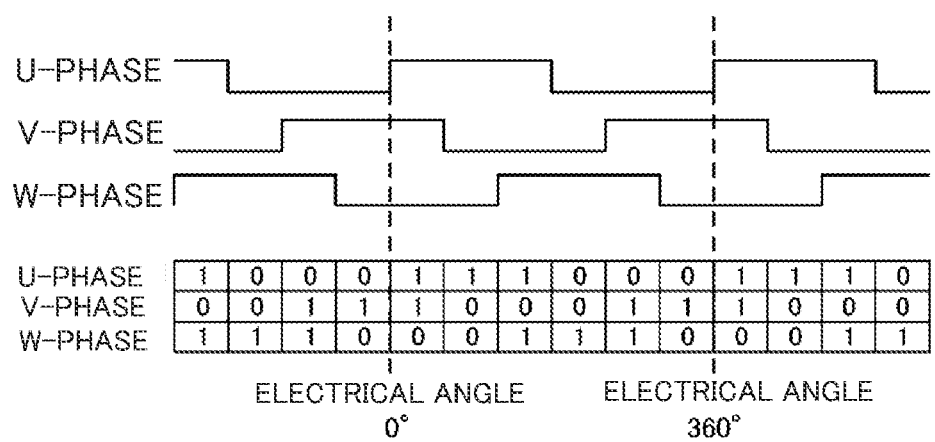
FIG. 13C is a diagram showing output waveforms (and output signals based on the output waveforms) from the actuator's rotation angle sensor upon reverse rotation.

For example, when the actuator's rotation angle sensor 135 is Hall ICs, the above-described difference Δ1 between the predetermined length S2 and the predetermined length S1 may be set as follows. When the actuator's rotation angle sensor 135 includes, for example, three Hall ICs 135-1, 135-2, and 135-3 disposed as shown in FIG. 13A, the actuator's rotation angle sensor 135 generates signals (see FIGS. 13B and 13C) that change every predetermined angle (here, every 60 degrees of electrical angle) determined based on the disposition of the Hall ICs 135-1, 135-2, and 135-3. Specifically, as indicated by output waveforms from the actuator's rotation angle sensor 135 upon forward rotation and upon reverse rotation in FIGS. 13B and 13C, signals that change every time the actuator 74 rotates at an electrical angle of 60 degrees are obtained from the actuator's rotation angle sensor 135. Thus, in this case, the resolution of the actuator's rotation angle sensor 135 is an electrical angle of 60 degrees. In addition, as with general sensors, a Hall IC can have a unique amount of error that the sensor itself has. Here, it is assumed that the unique amount of error of the Hall IC is angle α which is an electrical angle. The angle α may be a value obtained based on testing, etc., or may be a value obtained based on product specifications, or may be detected by a predetermined detection method. In such a case, the maximum value of an error component included in stroke information correlates with a value obtained by adding the angle α to 60 degrees which is a predetermined angle. Namely, a stroke length of the fork shaft 92 obtained when the actuator 74 rotates at an electrical angle of 60 degrees+α is the maximum value of an error component included in stroke information. Thus, in this case, the above-described difference Δ1 between the predetermined length S2 and the predetermined length S1 may be set so as to match a stroke length of the fork shaft 92 obtained when the actuator 74 rotates at an electrical angle of 60 degrees+α or so as to be slightly greater than the stroke length.

Note that the same also applies to the above-described difference 42 between the predetermined length S3 and the predetermined length S4. Note also that the position FB end condition that uses such a difference Δ1 may also be likewise applied to the FB end condition of the above-described first embodiment.

In addition, according to the present embodiment, as described above, unlike the above-described first embodiment, the method of switching between transition control modes differs between a transition process from a meshed state to a non-meshed state and a transition process from a non-meshed state to a meshed state.

Specifically, as described above, in a transition process from a non-meshed state to a meshed state, instead of a combination of feed-forward control and feedback control, constant-speed feedback control is implemented. As described above, the constant-speed feedback control is performed based on stroke information so that the increase speed of the stroke length of the fork shaft 92 (the amount of increase in stroke length per unit time) has a constant value.

Figure 14:
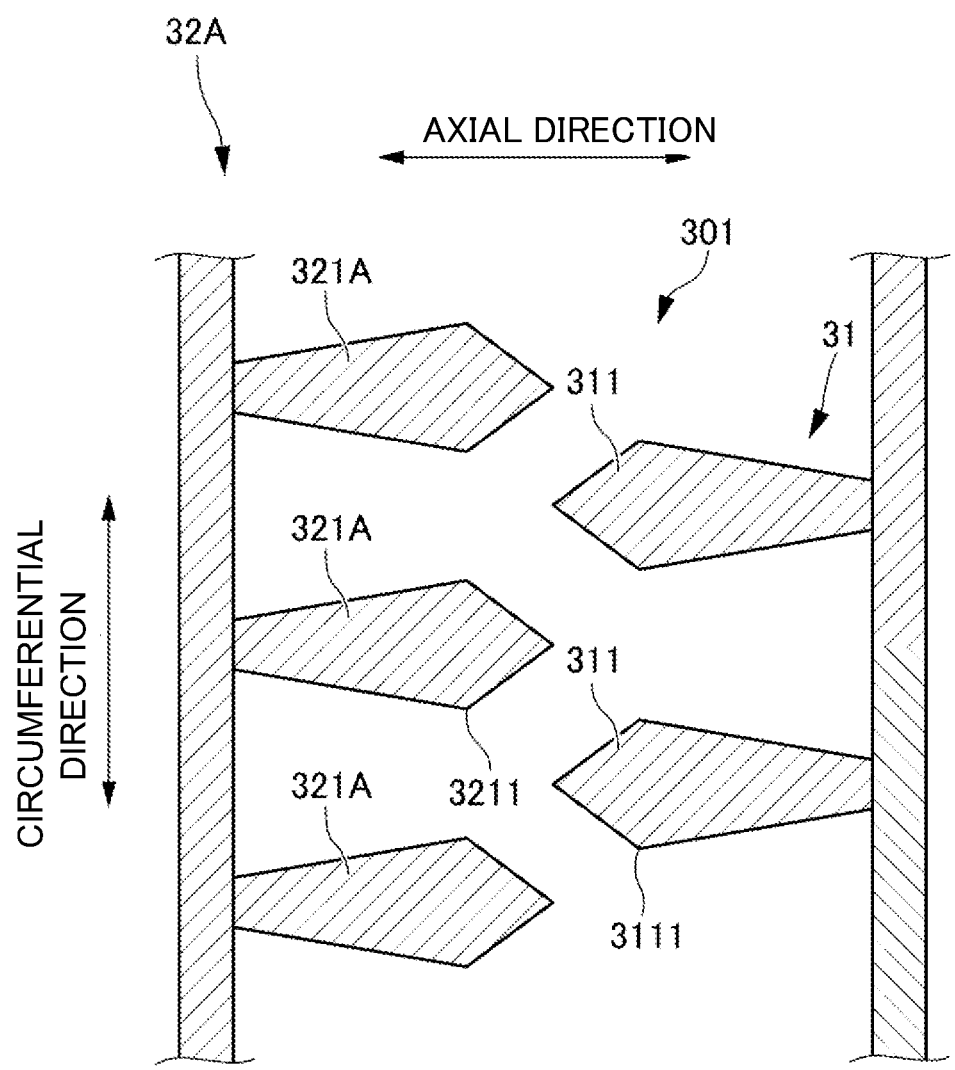
FIG. 14 is an illustrative diagram of advantageous effects of speed feedback control.

Now, with reference to FIG. 14, advantageous effects of constant-speed feedback control will be described. FIG. 14 is an illustrative diagram of advantageous effects of constant-speed feedback control. FIG. 14 schematically shows a part of each of the first element 31 and the second element 32A of the dog clutch 301 in a circumferentially developed state, as viewed in cross section. In FIG. 14, an "axial direction" corresponds to a direction along the shaft Is.

In FIG. 14, two tooth-like parts 311 among the plurality of tooth-like parts 311 of the first element 31 provided in the circumferential direction and three tooth-like parts 321A among the plurality of tooth-like parts 321A of the second element 32A provided in the circumferential direction are shown by solid lines.

The first element 31 of the dog clutch 301 rotates along with rotation of the motor 10 and thus the rotation phase changes. Thus, upon a transition from a non-meshed state to a meshed state, depending on the rotation phase of the first element 31, the tooth-like parts 311 can hit the tooth-like parts 321A. Note that even when the tooth-like parts 311 hit the tooth-like parts 321A, a circumferential force that allows the first element 31 to rotate occurs between the tooth-like parts 311 and the tooth-like parts 321A, and thus, basically, a transition from a non-meshed state to a meshed state is finally implemented.

However, when such a hit between the tooth-like parts 311 and the tooth-like parts 321A significantly strongly occurs, damage may be given to the tooth-like parts 311 and 321A. The hit between the tooth-like parts 311 and the tooth-like parts 321A is likely to get stronger as the moving speed for when the first element 31 moves toward the second element 32A in the axial direction (i.e., the moving speed of the fork shaft 92) increases. Note that the same can also be said for when the first element 31 moves toward the second element 32B in the axial direction in a transition process from a non-meshed state to a second meshed state.

In this regard, according to the present embodiment, in a transition process from a non-meshed state to a meshed state, feedback control is performed so that the increase speed of the stroke length of the fork shaft 92 (i.e., the increase speed is the moving speed of the fork shaft 92 and is correlated with the moving speed for when the first element 31 moves toward the second element 32A or the second element 32B in the axial direction) has a constant value. By this, in a transition process from a non-meshed state to a meshed state, the moving speed for when the first element 31 moves toward the second element 32A or the second element 32B in the axial direction can be prevented from becoming excessively high. By appropriately setting the constant value, even when the rotation phase of the first element 31 is a rotation phase at which the tooth-like parts 311 hit the tooth-like parts 321A or the tooth-like parts 321B, an inconvenience that can occur due to the hit between the tooth-like parts (e.g., damage to the tooth-like parts 311 and 321A, etc.) can be reduced.

Note that although, in the present embodiment, constant-speed feedback control is performed so that the increase speed of the stroke length of the fork shaft 92 (the amount of increase in stroke length per unit time) has a constant value, instead of this, constant-speed feedback control may be performed so that the increase speed of the stroke length of the fork shaft 92 does not exceed a constant value (predetermined upper limit value). In this case, the constant value is significantly smaller than an upper limit value of a range (controllable range) that can be taken by the increase speed of the stroke length of the fork shaft 92. In addition, although, in the present embodiment, a target speed for the increase speed of the stroke length of the fork shaft 92 has a constant value, the target speed may have a variable value that changes in a range in which an inconvenience that can occur due to a hit such as that described above (e.g., damage to the tooth-like parts 311 and 321A, etc.) can be reduced.

In addition, according to the present embodiment, as in a case of position feedback control by the position feedback control part 15331, before completing a transition from a meshed state to a non-meshed state, constant-speed feedback control by the constant-speed feedback control part 15332 ends and the operation of the actuator 74 stops, and thus, it is possible to stably converge the position of the lock ball 96 within the recessed parts 920, 921, and 922 of the fork shaft 92. Namely, it is possible to increase the convergence stability.

In addition, according to the present embodiment, in a transition process from a meshed state to a non-meshed state, position feedback control by the position feedback control part 15331 is performed, whereas in a transition process from a non-meshed state to a meshed state, constant-speed feedback control by the constant-speed feedback control part 15332 is performed. By this, while, in a transition process from a meshed state to a non-meshed state, a reduction in the time required for the transition process is achieved, in a transition process from a non-meshed state to a meshed state, an inconvenience caused by a hit between tooth-like parts such as that described above can be reduced. Note that in position feedback control by the position feedback control part 15331, as described above, a target position is fixed as a predetermined final target position (i.e., the target position does not change), and thus, the increase speed of the stroke length of the fork shaft 92 is likely to get higher than constant-speed feedback control by the constant-speed feedback control part 15332. In other words, a target speed (the above-described constant value) for constant-speed feedback control may be set so as to be smaller than an upper limit of a range of change in the increase speed of the stroke length of the fork shaft 92 that can be taken when position feedback control is performed.

Note, however, that in a variant, instead of position feedback control by the position feedback control part 15331, constant-speed feedback control by the constant-speed feedback control part 15332 may be performed. Namely, in the position feedback mode, as with constant-speed feedback control by the constant-speed feedback control part 15332, the position feedback control part 15331 may implement feedback control while changing, every control cycle, a target position toward a predetermined final target position. In this case, a target speed for constant-speed feedback control in a transition process from a meshed state to a non-meshed state may be higher than a target speed for constant-speed feedback control in a transition process from a non-meshed state to a meshed state.

Next, with reference to FIGS. 15 and 16, exemplary operation of the control device 100A related to a transition process will be described. In this processing flowchart, too, the processing order of steps may be changed as long as a relationship between the input and output of each step is not broken.

At step S1400, the control device 100A performs a process of obtaining/generating various types of information. Specifically, the control device 100A obtains various types of sensor information by the sensor information obtaining part 150, detects a required gear by the required-gear detecting part 151, generates stroke information by the actuator information generating part 154, and generates position information of the fork shaft 92 by the position information generating part 156.

At step S1402, the control device 100A determines whether the transition process flag F0 is "0". As described above, the transition process flag F0 is "1" in a state in which a transition process is being performed, and is otherwise "0". An initial value (a value at the start of the vehicle) of the transition process flag F0 is "0". If the result of the determination is "YES", then processing proceeds to step S1404, and otherwise proceeds to step S1411A.

At step S1404, the control device 100A determines whether a start condition for a transition process holds true. The start condition for a transition process is satisfied, for example, when a control mode for gear change control is set to the "dog disengaged" mode or the "dog engaged" mode (see FIG. 6). If the result of the determination is "YES", then processing proceeds to step S1405, and otherwise the process for this cycle ends.

At step S1405, the control device 100A sets the transition process flag F0 to "1" by the transition control mode switching part 1531A.

At step S1406, the control device 100A determines whether the control mode is set to the "dog disengaged" mode. If the result of the determination is "YES", then processing proceeds to step S1407, and otherwise proceeds to step S1409.

At step S1407, the control device 100A sets the transition control mode to the feed-forward mode and sets the FF flag F1 to "1" by the transition control mode switching part 1531A. As described above, the FF flag F1 is "1" in a state in which the transition control mode is the feed-forward mode, and is otherwise "0". An initial value (a value at the start of the vehicle) of the FF flag F1 is "0".

At step S1408, the control device 100A starts feed-forward control by the feed-forward control part 1532. Namely, the feed-forward control part 1532 applies a drive current with the predetermined value $I_{FF1}$ to the actuator 74 in a mode in which the output shaft of the actuator 74 rotates in a direction of rotation determined based on a meshed state of a transition destination.

At step S1409, the control device 100A sets the transition control mode to the constant-speed feedback mode and sets a speed FB flag F20 to "1" by the transition control mode switching part 1531A. The speed FB flag F20 is "1" in a state in which the transition control mode is the constant-speed feedback mode, and is otherwise "0". An initial value (a value at the start of the vehicle) of the speed FB flag F20 is "0".

At step S1410, the control device 100A starts constant-speed feedback control by the constant-speed feedback control part 15332. The constant-speed feedback control is as described above and exemplary details will be described later.

At step S1411A, the control device 100A determines whether the FF flag F1 is "1". If the result of the determination is "YES", then processing proceeds to step S1412, and otherwise proceeds to step S1411B.

At step S1411B, the control device 100A determines whether the speed FB flag F20 is "0". If the result of the determination is "YES", then processing proceeds to step S1420, and otherwise proceeds to step S1500.

At step S1412, the control device 100A determines, by the transition control mode switching part 1531A, whether the FB start condition holds true, based on stroke information obtained at step S1400. For example, in a case of the example shown in FIG. 11A, etc., the transition control mode switching part 1531A determines, based on the stroke information obtained at step S1400, whether the stroke length of the fork shaft 92 from the start of the feed-forward control at step S1408 has reached the predetermined length S0. If the result of the determination is "YES", then processing proceeds to step S1414, and otherwise proceeds to step S1418.

At step S1414, the control device 100A starts position feedback control by the position feedback control part 15331.

At step S1416, the control device 100A sets the transition control mode to the position feedback mode and resets the FF flag F1 to "0" by the transition control mode switching part 1531A.

At step S1418, the control device 100A continues, by the feed-forward control part 1532, the feed-forward control started at step S1408.

At step S1420, the control device 100A determines, by the transition control mode switching part 1531A, whether the position FB end condition holds true, based on stroke information obtained at step S1400. For example, in a case of the example shown in FIG. 11A, etc., the transition control mode switching part 1531A determines, based on the stroke information obtained at step S1400, whether the absolute value of a difference between a predetermined final target position and a current position is within a difference Δ1 (the difference Δ1 between the predetermined length S2 and the predetermined length S1 as described above with reference to FIG. 11A) (an example of a threshold value). The current position is determined based on the stroke length of the fork shaft 92 from the start of the feed-forward control at step S1408. Note that this determination is substantially equivalent to a determination as to whether the stroke length of the fork shaft 92 from the start of the feed-forward control at step S1408 has reached the predetermined length S1. If the result of the determination is "YES, then processing proceeds to step S1421, and otherwise proceeds to step S1426.

At step S1421, the control device 100A sets the transition control mode to the energization off mode by the transition control mode switching part 1531A. In this manner, before completing a transition from a meshed state to a non-meshed state, the position feedback control ends and the operation of the actuator 74 stops.

At step S1422, the control device 100A determines, based on the stroke information obtained at step S1400, whether the stroke length of the fork shaft 92 has reached a predetermined final target stroke length. Namely, the control device 100A determines whether the fork shaft 92 has reached the predetermined final target position (see the position P3 shown in FIG. 11A). If the result of the determination is "YES", then processing proceeds to step S1424. On the other hand, if the result of the determination is "NO", then the process for this cycle ends.

At step S1424, the control device 100A ends the transition process, and resets the transition process flag F0 to "0" by the transition control mode switching part 1531A.

At step S1426, the control device 100A continues, by the position feedback control part 15331, the position feedback control started at step S1414.

At step S1500, the control device 100A continues, by the constant-speed feedback control part 15332, the constant-speed feedback control started at step S1410. A specific example of the constant-speed feedback control will be described below with reference to FIG. 16.

Figure 16:
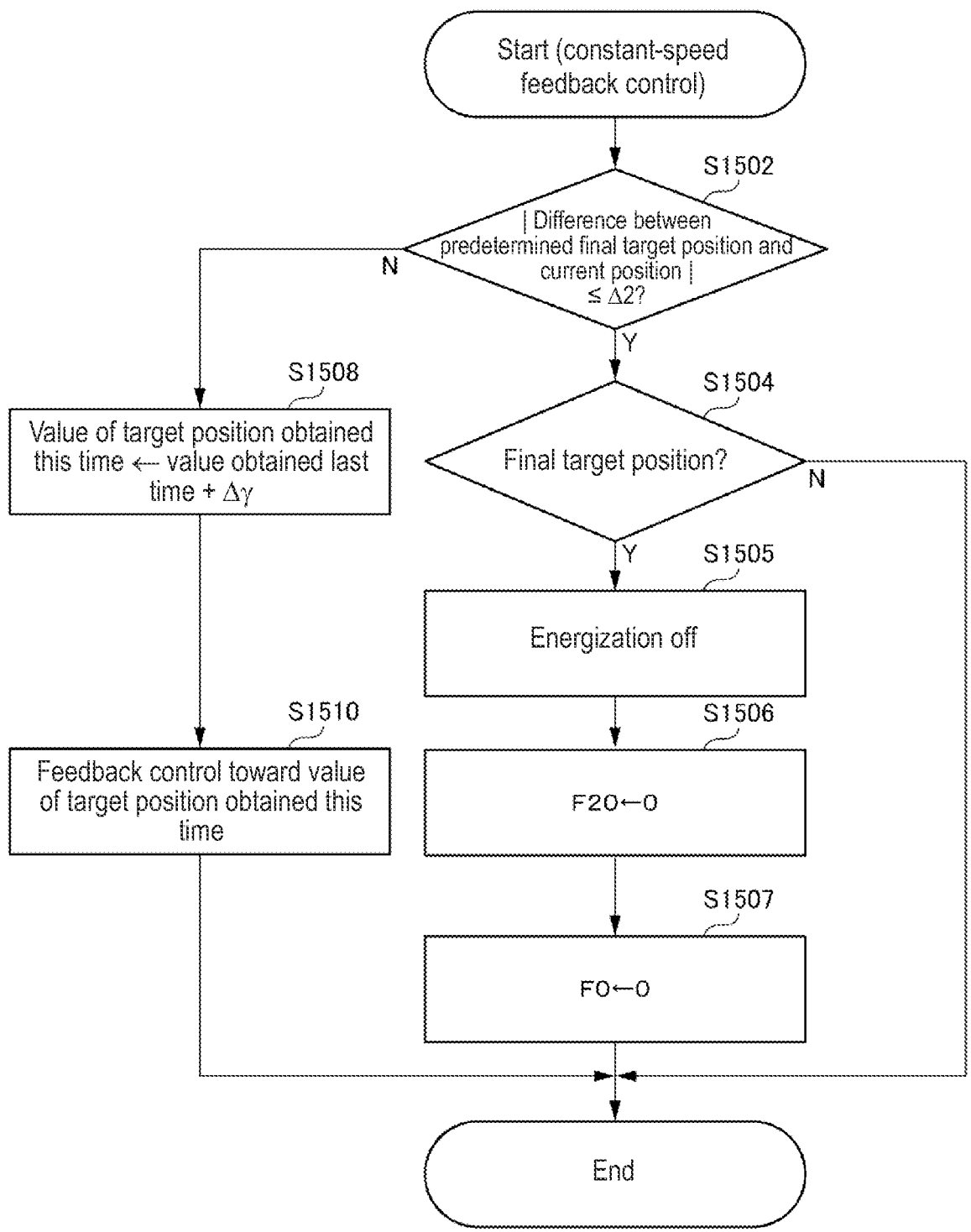
FIG. 16 is a schematic flowchart showing an example of a process related to constant-speed feedback control.

Referring to FIG. 16, at step S1502, the constant-speed feedback control part 15332 determines, by the transition control mode switching part 1531A, whether the speed FB end condition holds true, based on stroke information obtained at step S1400. For example, in a case of the example shown in FIG. 11A, etc., the transition control mode switching part 1531A determines, based on the stroke information obtained at step S1400, whether the absolute value of a difference between a predetermined final target position and a current position is within a difference 42 (the difference 42 between the predetermined length S3 and the predetermined length S4 as described above with reference to FIG. 11A) (an example of a threshold value). The current position is determined based on the stroke length of the fork shaft 92 from the start of the constant-speed feedback control at step S1410. Note that this determination is substantially equivalent to a determination as to whether the stroke length of the fork shaft 92 from the start of the constant-speed feedback control at step S1410 has reached the predetermined length S3. If the result of the determination is "YES, then processing proceeds to step S1504, and otherwise proceeds to step S1508.

At step S1504, the constant-speed feedback control part 15332 determines, based on the stroke information obtained at step S1400, whether the fork shaft 92 has reached the predetermined final target position (see the position P5 shown in FIG. 11A). If the result of the determination is "YES", then processing proceeds to step S1505. On the other hand, if the result of the determination is "NO", then the process for this cycle ends.

At step S1505, the control device 100A sets the transition control mode to the energization off mode by the transition control mode switching part 1531A. In this manner, before completing a transition from a non-meshed state to a meshed state, the constant-speed feedback control ends and the operation of the actuator 74 stops.

At step S1506, the constant-speed feedback control part 15332 resets the speed FB flag F20 to "0" by the transition control mode switching part 1531A.

At step S1507, the constant-speed feedback control part 15332 ends the transition process, and resets the transition process flag F0 to "0" by the transition control mode switching part 1531A.

At step S1508, the constant-speed feedback control part 15332 increases the value of the target position for constant-speed feedback control obtained this time by an amount corresponding to a predetermined increase Δγ relative to a value obtained last time. As described above, the constant-speed feedback control is performed so that the increase speed of the stroke length of the fork shaft 92 (i.e., the moving speed for when the first element 31 moves toward the second element 32A or the second element 32B in the axial direction) has a constant value. Thus, the amount corresponding to the predetermined increase Δγ corresponds to the constant value. Note that when the value of the target position for constant-speed feedback control obtained last time matches the predetermined final target position, the value obtained this time remains the same as the value obtained last time.

At step S1510, the constant-speed feedback control part 15332 performs constant-speed feedback control, based on the value of the target position obtained this time which is set at step S1508. Namely, the actuator 74 is controlled so that the stroke information (the stroke length of the fork shaft 92) obtained at step S1400 matches a stroke length corresponding to the value of the target position obtained this time which is set at step S1508.

Figure 15:
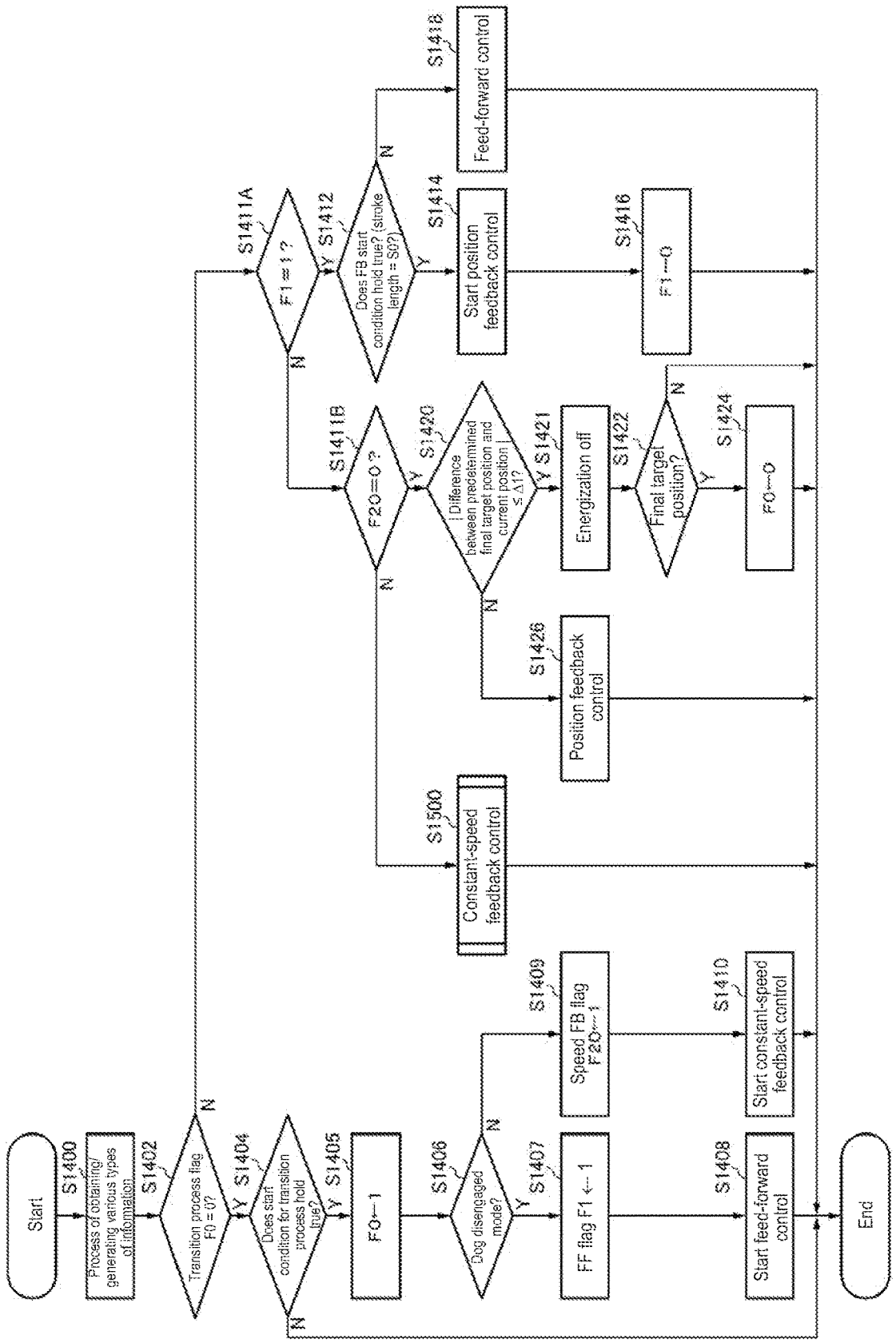
FIG. 15 is a schematic flowchart showing an example of a process performed by the control device in relation to a transition process of the second embodiment.

According to the processes shown in FIGS. 15 and 16, when the start condition for a transition process holds true by the control mode set to the "dog disengaged" mode ("YES" at step S1406), first, feed-forward control is performed, and then position feedback control is performed. By this, while the start of a stroke (initial action) of the fork shaft 92 is promoted, it becomes easy to allow the fork shaft 92 to reach a predetermined final target position in a mode in which overshoot is less likely to occur.

In addition, according to the processes shown in FIGS. 15 and 16, before completing a transition from a meshed state to a non-meshed state, position feedback control ends and the operation of the actuator 74 stops, and thus, as described above, the convergence stability in position feedback control can be increased.

In addition, according to the processes shown in FIGS. 15 and 16, when the start condition for a transition process holds true by the control mode set to the "dog engaged" mode ("NO" at step S1406), constant-speed feedback control is performed until the speed FB end condition is satisfied. By this, as described above, even when the rotation phase of the first element 31 is a rotation phase at which the tooth-like parts 311 hit the tooth-like parts 321A or the tooth-like parts 321B upon the start of the transition process, an inconvenience that can occur in the transition process due to the hit between the tooth-like parts (e.g., damage to the tooth-like parts 311 and 321A, etc.) can be reduced.

In addition, according to the processes shown in FIGS. 15 and 16, before completing a transition from a non-meshed state to a meshed state, constant-speed feedback control ends and the operation of the actuator 74 stops, and thus, as described above, the convergence stability in constant-speed feedback control can be increased.

Note that in the present embodiment, as described above, as an example, the distance $\Delta L_{N2}$=the distance $\Delta L_{N1}$ and the distance $\Delta L_{H1}$=the distance $\Delta L_{L2}$ (see FIG. 3), and thus, the processes shown in FIGS. 15 and 16 can be applied to both of a transition from a first meshed state to a non-meshed state and a subsequent transition from the non-meshed state to a second meshed state, and a transition from a second meshed state to a non-meshed state and a subsequent transition from the non-meshed state to a first meshed state. Note that when the distance $\Delta L_{N2}$=the distance $\Delta L_{N1}$ and the distance $\Delta L_{H1}$=the distance $\Delta L_{L2}$ do not hold true, the value of each of the predetermined length S0, the predetermined length S1, the predetermined length S2, the predetermined length S3, and the predetermined length S4 (and the difference Δ1 and the difference 42 accordingly) just differs accordingly, and the flow of the process itself is the same.

Although each embodiment is described in detail above, the present disclosure is not limited to specific embodiments, and it is possible to make various modifications and changes that fall within the scope described in the claims. In addition, it is also possible to combine together all or a plurality of components of the above-described embodiments.

For example, although each of the above-described embodiments describes an exemplary application to the specific vehicle drive device 1 shown in FIG. 1, the embodiments can also be applied to a vehicle drive device having any number of shift speeds, any type of connection modes, etc., as long as the vehicle drive device has a configuration in which the state of the clutch changes in synchronization with the shift detent mechanism 90 which is driven by the actuator 74. Thus, an applicable drive device is not limited to one for an electric vehicle, and may be one for a hybrid vehicle or may be one for a vehicle that does not use the motor 10 as a drive source (i.e., uses only an internal combustion engine as a drive source).

In addition, although in the above-described second embodiment, in a transition process from a non-meshed state to a meshed state, the constant-speed feedback mode continues until the constant-speed feedback mode is switched to the energization off mode, the configuration is not limited thereto. For example, in a transition process from a non-meshed state to a meshed state, the constant-speed feedback mode may be initially formed, and then the energization off mode may be implemented with the position feedback mode therebetween. In this case, switching from the constant-speed feedback mode to the position feedback mode may be implemented at a stage at which meshing between the tooth-like parts 311 and the tooth-like parts 321A or the tooth-like parts 321B is substantially implemented (e.g., a stage at which in FIG. 14, an axial position of a maximum width part 3111 of a tooth-like part 311 matches or exceeds, by some amount, an axial position of a maximum width part 3211 of a tooth-like part 321A). In addition, in this case, switching from the position feedback mode to the energization off mode may be implemented by satisfying the above-described speed FB end condition.

<Additional Notes>

For the above-described embodiments, the following is further disclosed. Note that of advantageous effects described below, an advantageous effect for each additional mode with respect to one mode is an additional advantageous effect resulting from that each additional mode.

(1) In one mode, a vehicle drive device (1) includes:
a shift detent mechanism (90);
an actuator (74) that generates drive power for allowing the shift detent mechanism to operate;
a sensor (135) that generates sensor information indicating an amount of operation of the shift detent mechanism;
a control part (153) that controls the actuator; and
a clutch (30) that is synchronized with operation of the shift detent mechanism, and
when the control part changes a state of the clutch, the control part performs feedback control of the actuator based on a relationship between a target value for an amount of operation of the shift detent mechanism and the sensor information, and
before completing the change in the state of the clutch, the feedback control ends and operation of the actuator stops.

According to this mode, feedback control ends and the operation of the actuator stops before completing a change in the state of the clutch, and thus, compared to a case in which feedback control continues until a change in the state of the clutch is completed, the convergence stability of the shift detent mechanism can be increased. Note that when feedback control continues until a change in the state of the clutch is completed, the convergence stability of the shift detent mechanism is likely to be impaired due to the influence of an error in sensor information from the sensor.

(2) In addition, in this mode, it is preferred that the operation of the actuator stop when a magnitude of a difference reaches less than or equal to a threshold value ($\Delta 1$, $\Delta 2$) greater than 0, the difference being obtained by subtracting the amount of operation indicated by the sensor information from an amount of operation of the shift detent mechanism obtained when the change in the state of the clutch is completed.

In this case, the convergence stability of the shift detent mechanism that can be impaired due to an error in sensor information from the sensor can be improved based on a relationship between the error in the sensor information from the sensor and the threshold value.

(3) In addition, in this mode, it is preferred that the sensor generate a signal that changes every certain amount of operation of the shift detent mechanism, and the threshold value be set based on the certain amount of operation.

In this case, the convergence stability of the shift detent mechanism that can be impaired due to an error in sensor information from the sensor can be appropriately improved in a mode in which an error (ambiguity) in sensor information caused by sensor resolution is taken into account.

(4) In addition, in this mode, it is preferred that the threshold value be greater than or equal to a value obtained by adding a unique amount of error that the sensor itself has to the certain amount of operation.

In this case, the convergence stability of the shift detent mechanism that can be impaired due to an error in sensor information from the sensor can be appropriately improved in a mode in which various error factors in sensor information are taken into account.

(5) In addition, in this mode, it is preferred that the clutch include a first element (31) and a second element (32A, 32B) that go into a meshed state when coming close to each other and go into a non-meshed state when separated from each other, the feedback control include first feedback control performed so that an increase speed of an amount of operation of the shift detent mechanism is constant, and when the control part changes the state of the clutch from the non-meshed state to the meshed state, the control part perform the first feedback control.

In this case, an inconvenience that can occur when the state of the clutch changes from a non-meshed state to a meshed state in a relatively short time (an inconvenience, e.g., tooth-like parts that mesh together collide with each other at a relatively high relative speed) can be reduced.

(6) In addition, in this mode, it is preferred that the feedback control include second feedback control performed so that the amount of operation indicated by the sensor information matches an amount of operation of the shift detent mechanism obtained when the non-meshed state is implemented, and when the control part changes the state of the clutch from the meshed state to the non-meshed state, the control part perform feed-forward control of the actuator and then perform the second feedback control.

In this case, by also using feed-forward control, the convergence stability of the shift detent mechanism can be increased while the state of the clutch changes from a meshed state to a non-meshed state in a relatively short time. In addition, a control mode can be made different between when the state of the clutch changes from a meshed state to a non-meshed state and when the state of the clutch changes from a non-meshed state to a meshed state.

(7) In addition, in this mode, it is preferred that the clutch include a first element and a second element that go into a meshed state when coming close to each other and go into a non-meshed state when separated from each other, and when the control part changes the state of the clutch from the meshed state to the non-meshed state, the control part perform feed-forward control of the actuator and then perform the feedback control.

In this case, by also using feed-forward control, the convergence stability of the shift detent mechanism can be increased while the state of the clutch changes from a meshed state to a non-meshed state in a relatively short time.

(8) In addition, in this mode, it is preferred that the shift detent mechanism include:

an engagement element (96) that can move in a first direction (Y);

a recessed-part forming member (92) that can move relative to the engagement element in a second direction (X) intersecting the first direction and that includes, in the second direction, a plurality of recessed parts (920, 921, 922) in which the engagement element can fit; and an elastic member that biases the engagement element in the first direction toward the recessed-part forming member, the actuator generate drive power for allowing the recessed-part forming member to move with respect to the engagement element, the clutch be synchronized with movement of the recessed-part forming member with respect to the engagement element in the second direction, and the control part change the state of the clutch by making a transition from a state in which the engagement element fits in one recessed part among the plurality of recessed parts to a state in which the engagement element fits in another recessed part.

In this case, the stability of convergence for the position of the engagement element in a recessed part (the convergence stability of the shift detent mechanism) can be increased. Namely, the stability of convergence up to a point where the engagement element reaches the deepest position of a recessed part can be increased.

(9) In addition, in this mode, it is preferred that the sensor information indicate a movement distance of the recessed-part forming member with respect to the engagement element in the second direction.

In this case, feedback control, etc., can be accurately performed using a mechanical relationship between the recessed-part forming member and the engagement element (e.g., a known relationship based on design values).

(10) In another mode, a control device (100, 100A) that changes a state of a clutch (30) by driving a shift detent mechanism (90) of a vehicle drive device (1) by an actuator (74) is configured to:

obtain sensor information indicating an amount of operation of the shift detent mechanism; and perform feedback control of the actuator based on a relationship between a target value for an amount of operation of the shift detent mechanism and the sensor information, when the control device changes the state of the clutch, and before completing the change in the state of the clutch, the feedback control ends and operation of the actuator stops.

According to this mode, feedback control ends and the operation of the actuator stops before completing a change in the state of the clutch, and thus, compared to a case in which feedback control continues until a change in the state of the clutch is completed, the convergence stability of the shift detent mechanism can be increased.

Note that in still another mode, a control method for changing a state of a clutch (30) by driving a shift detent mechanism (90) of a vehicle drive device (1) by an actuator (74) is performed by a computer and includes:

obtaining sensor information indicating an amount of operation of the shift detent mechanism; and performing feedback control of the actuator based on a relationship between a target value for an amount of operation of the shift detent mechanism and the sensor information, when a state of the clutch changes, and before completing the change in the state of the clutch, the feedback control ends and operation of the actuator stops.

In addition, in yet another mode, a control program for changing a state of a clutch (30) by driving a shift detent mechanism (90) of a vehicle drive device (1) by an actuator (74) causes a computer to perform processes of:

obtaining sensor information indicating an amount of operation of the shift detent mechanism; and performing feedback control of the actuator based on a relationship between a target value for an amount of operation of the shift detent mechanism and the sensor information, when a state of the clutch changes, and before completing the change in the state of the clutch, the feedback control ends and operation of the actuator stops.

Note that a control program in such a mode can be distributed in a state of being stored in any computer-readable recording medium (see the above-described recording medium 116) or may be used in a mode in which the control program is, for example, downloaded from a server (not shown), etc., through a network. Note that in this case, the network may be a variety of networks such as those described above.

Meanwhile, in conventional art such as that described above, feedback control is performed over the entire period from the start of drive until it is determined that an engagement part has moved to the bottom of a recessed part of a detent plate corresponding to a target shift range. In such a configuration, it is difficult to drive the detent plate pressed by the engagement part of a detent spring, with excellent responsiveness.

Hence, one aspect provides a vehicle drive device including a shift detent mechanism that can allow a clutch to work together therewith with excellent responsiveness.

(11) In this aspect, in one mode, a vehicle drive device (1) includes:

a shift detent mechanism (90);

an actuator (74) that generates drive power for allowing the shift detent mechanism to operate;

a control part (153) that controls the actuator; and a clutch (30) that is synchronized with operation of the shift detent mechanism, and when the control part changes a state of the clutch, the control part implements a first control mode until an amount of operation of the shift detent mechanism reaches a predetermined amount, and implements a second control mode when an amount of operation of the shift detent mechanism reaches the predetermined amount, the first control mode being feed-forward control and the second control mode being different from the first control mode.

According to this mode, when the state of the clutch changes, the first control mode which is feed-forward control is implemented until the amount of operation of the shift detent mechanism reaches the predetermined amount, and thus responsiveness can be improved. In addition, the second control mode different from the first control mode is implemented when the amount of operation of the shift detent mechanism reaches the predetermined amount, and thus a control mode in which the shift detent mechanism can be appropriately terminated can be implemented. By this, the shift detent mechanism that can allow the clutch to work together therewith with excellent responsiveness can be implemented.

(12) In addition, in this mode, it is preferred that the second control mode be any one of feedback control, stopping of energization of the actuator, and feed-forward control with a smaller drive current than the feed-forward control related to the first control mode.

In this case, the shift detent mechanism can be appropriately terminated while responsiveness at the start of operation is improved.

(13) In addition, in this mode, it is preferred that the shift detent mechanism include:

an engagement element (96) that can move in a first direction (Y);

a recessed-part forming member (92) that can move relative to the engagement element in a second direction (X) intersecting the first direction and that includes, in the second direction, a plurality of recessed parts (920, 921, 922) in which the engagement element can fit; and an elastic member (94) that biases the engagement element in the first direction toward the recessed-part forming member, the actuator generate drive power for allowing the recessed-part forming member to move with respect to the engagement element, the clutch be synchronized with movement of the recessed-part forming member with respect to the engagement element in the second direction, and when the control part changes the state of the clutch by making a transition from a state in which the engagement element fits in one recessed part among the plurality of recessed parts to a state in which the engagement element fits in another recessed part, the control part implement the first control mode until a movement distance of the recessed-part forming member with respect to the engagement element in the second direction reaches a first distance (S0), and implement the second control mode when the movement distance reaches the first distance, the movement distance being an amount of operation of the shift detent mechanism and the first distance being the predetermined amount.

In this case, switching from the first control mode to the second control mode can be performed at appropriate timing that conforms to a positional relationship between the recessed parts of the shift detent mechanism and the engagement element.

(14) In addition, in this mode, it is preferred that the first distance be a distance in the second direction on the recessed-part forming member, and correspond to a distance from a point at the one recessed part that has a deepest depth in the first direction (the position $P_N$, the position $P_{Low}$, the position $P_{High}$) to a point between the one recessed part and the another recessed part in the second direction that has a highest height in the first direction.

In this case, switching from the first control mode to the second control mode can be performed at timing at which the engagement element reaches a point between one recessed part and another recessed part in the second direction that has the highest height in the first direction.

(15) In addition, in this mode, it is preferred that the second control mode be feedback control or feed-forward control with a smaller drive current than the feed-forward control related to the first control mode, the control part stop energization of the actuator when the movement distance of the recessed-part forming member reaches a second distance (S1) longer than the first distance, and the second distance be a distance in the second direction on the recessed-part forming member and be shorter than a distance (S2) from a point at the one recessed part that has a deepest depth in the first direction to a point at the another recessed part that has a deepest depth in the first direction.

In this case, the second control mode can be terminated at appropriate timing that conforms to a positional relationship between the recessed parts of the shift detent mechanism and the engagement element.

(16) In addition, in this mode, it is preferred that the clutch include a first element (31) and a second element (32A, 32B) that go into a meshed state when coming close to each other in the second direction and go into a non-meshed state when separated from each other in the second direction, a state in which the engagement element fits in the one recessed part correspond to the meshed state or the non-meshed state, and a state in which the engagement element fits in the another recessed part correspond to the non-meshed state or the meshed state.

In this case, a transition between the meshed state and non-meshed state of the clutch can be implemented with excellent responsiveness.

REFERENCE SIGNS LIST

1: Vehicle drive device, 7: Power transferring part, 10: Motor, 20: Planetary gear mechanism, 21: Sun gear, 22: Ring gear, 23: Pinion, 24: Carrier, 30: Engagement device, 31: First element, 32A: Second element, 32B: Second element, 41: First gear train, 42: Second gear train, 50: Countershaft, 60: Output shaft (differential shaft), 70: Shift fork, 72: Ball screw mechanism, 74: Actuator, 90: Shift detent mechanism, 92: Fork shaft, 94: Coil spring, 96: Lock ball, 100, 100A: Control device, 130: In-vehicle electronic device, 131: Shift position sensor, 132: Wheel speed sensor, 134: Number-of-motor-revolutions sensor, 135: Actuator's rotation angle sensor, 150: Sensor information obtaining part, 151: Required-gear detecting part, 152: Motor control part, 153, 153A: Actuator control part, 1531, 1531A: Transition control mode switching part, 1532: Feed-forward control part, 1533: Feedback control part, 15331: Position feedback control part, 15332: Constant-speed feedback control part, 154: Actuator information generating part, 156: Position information generating part, 157: Gear change control part, 301: Dog clutch, 302: Dog clutch, 304: Clutch hub, 311: Tooth-like part, 312: Recessed groove, 321A: Tooth-like part, 321B: Tooth-like part, 721: Nut, 722: Screw shaft, 922: Recessed part (detent), 920: Recessed part (detent), and 921: Recessed part (detent)

The invention claimed is:

1. A vehicle drive device comprising:
a shift detent mechanism;
an actuator that generates drive power for allowing the shift detent mechanism to operate;
a sensor that generates sensor information indicating an amount of operation of the shift detent mechanism;
a control part that controls the actuator; and
a clutch that is synchronized with operation of the shift detent mechanism,
wherein
when the control part changes a state of the clutch, the control part performs feedback control of the actuator based on a relationship between a target value for an amount of operation of the shift detent mechanism and the sensor information, and
before completing the change in the state of the clutch, the feedback control ends and operation of the actuator stops.

2. The vehicle drive device according to claim 1, wherein the operation of the actuator stops when a magnitude of a difference reaches less than or equal to a threshold value greater than 0, the difference being obtained by subtracting the amount of operation indicated by the sensor information from an amount of operation of the shift detent mechanism obtained when the change in the state of the clutch is completed.

3. The vehicle drive device according to claim 2, wherein
the sensor generates a signal that changes every certain amount of operation of the shift detent mechanism, and
the threshold value is set based on the certain amount of operation.

4. The vehicle drive device according to claim 3, wherein the threshold value is greater than or equal to a value obtained by adding a unique amount of error that the sensor itself has to the certain amount of operation.

5. The vehicle drive device according to claim 3, wherein
the clutch includes a first element and a second element that go into a meshed state when coming close to each other and go into a non-meshed state when separated from each other,
the feedback control includes first feedback control performed so that an increase speed of an amount of operation of the shift detent mechanism is constant, and
when the control part changes the state of the clutch from the non-meshed state to the meshed state, the control part performs the first feedback control.

6. The vehicle drive device according to claim 2, wherein
the clutch includes a first element and a second element that go into a meshed state when coming close to each other and go into a non-meshed state when separated from each other,
the feedback control includes first feedback control performed so that an increase speed of an amount of operation of the shift detent mechanism is constant, and
when the control part changes the state of the clutch from the non-meshed state to the meshed state, the control part performs the first feedback control.

7. The vehicle drive device according to claim 6, wherein
the feedback control includes second feedback control performed so that the amount of operation indicated by the sensor information matches an amount of operation of the shift detent mechanism obtained when the non-meshed state is implemented, and
when the control part changes the state of the clutch from the meshed state to the non-meshed state, the control part performs feed-forward control of the actuator and then performs the second feedback control.

8. The vehicle drive device according to claim 2, wherein
the clutch includes a first element and a second element that go into a meshed state when coming close to each other and go into a non-meshed state when separated from each other, and
when the control part changes the state of the clutch from the meshed state to the non-meshed state, the control part performs feed-forward control of the actuator and then performs the feedback control.

9. The vehicle drive device according to claim 1, wherein
the clutch includes a first element and a second element that go into a meshed state when coming close to each other and go into a non-meshed state when separated from each other,
the feedback control includes first feedback control performed so that an increase speed of an amount of operation of the shift detent mechanism is constant, and
when the control part changes the state of the clutch from the non-meshed state to the meshed state, the control part performs the first feedback control.

10. The vehicle drive device according to claim 9, wherein
the feedback control includes second feedback control performed so that the amount of operation indicated by the sensor information matches an amount of operation of the shift detent mechanism obtained when the non-meshed state is implemented, and
when the control part changes the state of the clutch from the meshed state to the non-meshed state, the control part performs feed-forward control of the actuator and then performs the second feedback control.

11. The vehicle drive device according to claim 1, wherein
the clutch includes a first element and a second element that go into a meshed state when coming close to each other and go into a non-meshed state when separated from each other, and
when the control part changes the state of the clutch from the meshed state to the non-meshed state, the control part performs feed-forward control of the actuator and then performs the feedback control.

12. The vehicle drive device according to claim 1, wherein
the shift detent mechanism includes:
an engagement element that can move in a first direction;
a recessed-part forming member that can move relative to the engagement element in a second direction intersecting the first direction and that includes, in the second direction, a plurality of recessed parts in which the engagement element can fit; and
an elastic member that biases the engagement element in the first direction toward the recessed-part forming member,
the actuator generates drive power for allowing the recessed-part forming member to move with respect to the engagement element,
the clutch is synchronized with movement of the recessed-part forming member with respect to the engagement element in the second direction, and
the control part changes the state of the clutch by making a transition from a state in which the engagement element fits in one recessed part among the plurality of recessed parts to a state in which the engagement element fits in another recessed part.

13. The vehicle drive device according to claim 12, wherein the sensor information indicates a movement distance of the recessed-part forming member with respect to the engagement element in the second direction.

14. A control device that changes a state of a clutch by driving a shift detent mechanism of a vehicle drive device by an actuator, the control device being configured to:
obtain sensor information indicating an amount of operation of the shift detent mechanism; and
perform feedback control of the actuator based on a relationship between a target value for an amount of operation of the shift detent mechanism and the sensor information, when the control device changes the state of the clutch,
wherein
before completing the change in the state of the clutch, the feedback control ends and operation of the actuator stops.

\* \* \* \* \*